(12) United States Patent
Singh et al.

(10) Patent No.: US 11,336,194 B1
(45) Date of Patent: May 17, 2022

(54) DC-AC CONVERTER

(71) Applicants: Vikram Singh, Yamuna Nagar (IN); Ankur Bal, Greater Noida (IN); Vineet Mehta, Herndon, VA (US); Jitender Singh, San Jose, CA (US)

(72) Inventors: Vikram Singh, Yamuna Nagar (IN); Ankur Bal, Greater Noida (IN); Vineet Mehta, Herndon, VA (US); Jitender Singh, San Jose, CA (US)

(73) Assignee: VJ Intellia, San Jose, CA (US)

( * ) Notice: Subject to any disclaimer, the term of this patent is extended or adjusted under 35 U.S.C. 154(b) by 0 days.

(21) Appl. No.: 17/221,905

(22) Filed: Apr. 5, 2021

(51) Int. Cl.
  *H02M 7/42* (2006.01)
  *H02M 3/335* (2006.01)
  *H02M 1/12* (2006.01)

(52) U.S. Cl.
  CPC ....... *H02M 3/33592* (2013.01); *H02M 1/126* (2013.01)

(58) Field of Classification Search
  CPC ......... H02M 3/33576; H02M 3/33592; H02M 1/126; H02M 7/42; H02M 7/4803; H02M 7/46; H02M 7/48; H02M 7/4807
  See application file for complete search history.

(56) References Cited

U.S. PATENT DOCUMENTS

| 7,885,049 B2 * | 2/2011 | Crewson | .................. | H03K 3/57 |
| | | | | 361/98 |
| 8,279,571 B2 * | 10/2012 | Crewson | .................. | H03K 3/57 |
| | | | | 361/94 |

* cited by examiner

*Primary Examiner* — Adolf D Berhane
(74) *Attorney, Agent, or Firm* — Dhiraj Jindal; Patent Yogi LLC

(57) ABSTRACT

Disclosed herein is a DC-AC converter, in accordance with some embodiments. Accordingly, the DC-AC converter comprises a transformer, a pulse generator, a pulse modulator, a switching element, and an analog low pass filtering stage. Further, the pulse generator is configured for generating pulses characterized by a pulse frequency. Further, the pulse modulator is configured for generating a pulse density modulated signal based on modulating the pulses using a sine wave signal of a fundamental frequency. Further, the switching element is connected in series with a primary winding of the transformer. Further, the switching element is configured to be switched between an on state and an off state based on the pulse density modulated signal. Further, the analog low pass filtering stage is configured for generating an AC voltage of the fundamental frequency based on attenuating higher frequency components of an unfiltered AC voltage at a secondary winding of the transformer.

20 Claims, 19 Drawing Sheets

DC-AC CONVERTER

FIELD OF THE INVENTION

Generally, the present disclosure relates to the field of electric power conversion systems. More specifically, the present disclosure relates to a DC-AC converter.

BACKGROUND OF THE INVENTION

DC-AC inverters (converters) are used for generating AC voltages from DC voltages. Further, the DC-AC inverters find use in automotive, domestic, and industrial applications. An output of the DC-AC inverters is a regulated pure sinusoid.

Further, the DC-AC inverters may employ a DC-AC conversion architecture. Further, the DC-AC conversion architecture of the DC-AC inverters is designed to increase the conversion efficiency and reduce the physical size of the DC-AC inverters. Further, the DC-AC inverters employ a multiple-step conversion process with a first step being stepping up a low DC voltage from a battery to a high DC voltage using a high-frequency transformer and a rectifier. Further, a second step involves the conversion of the high DC voltage to a high AC voltage sinusoid using a high voltage MOS bridge and a passive filter. Further, the multiple-step power conversion process may include pulsing the low DC voltage from the battery to a high-frequency PWM (Pulse Width Modulation) signal, applying the high-frequency PWM signal to a primary side of an HF (High Frequency) step-up transformer, rectifying high-frequency pulses at a secondary side of the HF step-up transformer, generating low-frequency pulses from rectified DC, and filtering the low-frequency pulses to achieve the high AC voltage sinusoid.

Existing DC-AC inverters are deficient with regard to several aspects. For instance, existing DC-AC inverters include multiple power conversion stages which are not desirable. Furthermore, existing DC-AC inverters include multiple high voltage active devices on a load side of the DC-AC inverters. Moreover, existing DC-AC inverters provide an output sine wave with THD (Total Harmonic Distortion) greater than 1%. Further, existing DC-AC inverters do not provide design scalability and design modularity.

Therefore, there is a need for an improved DC-AC converter that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a DC-AC converter, in accordance with some embodiments. Accordingly, the DC-AC converter may include a transformer, a pulse generator, a pulse modulator, a switching element, and an analog low pass filtering stage. Further, the transformer may include a primary winding and a secondary winding. Further, the transformer may be a step-up transformer. Further, the primary winding may be electrically coupled to a DC voltage source. Further, the pulse generator may be configured for generating a plurality of pulses characterized by a pulse frequency. Further, the pulse modulator may be electrically coupled with the pulse generator. Further, the pulse modulator may be configured for generating a pulse density modulated signal based on modulating the plurality of pulses using a sine wave signal of a fundamental frequency. Further, the switching element may be electrically coupled to the primary winding. Further, the switching element may be connected in series with the primary winding. Further, the switching element may be electrically coupled with the pulse modulator. Further, the switching element may be configured to be switched between an on state and an off state based on the pulse density modulated signal. Further, the switching element allows a passage of current in the primary winding in the on state. Further, the switching element does not allow the passage of the current in the primary winding in the off state. Further, the analog low pass filtering stage may be electrically coupled to the secondary winding. Further, the analog low pass filtering stage may be configured for generating an AC voltage of the fundamental frequency based on attenuating a plurality of higher frequency components of an unfiltered AC voltage at the secondary winding.

Further disclosed herein is a DC-AC converter, in accordance with some embodiments. Accordingly, the DC-AC converter may include a transformer, a pulse generator, a pulse modulator, a sinusoid source, a switching element, and an analog low pass filtering stage. Further, the transformer may include a primary winding and a secondary winding. Further, the transformer may be a step-up transformer. Further, the primary winding may be electrically coupled to a DC voltage source. Further, the pulse generator may be configured for generating a plurality of pulses characterized by a pulse frequency. Further, the pulse modulator may be electrically coupled with the pulse generator. Further, the pulse modulator may be configured for generating a pulse density modulated signal based on modulating the plurality of pulses using a sine wave signal of a fundamental frequency. Further, the sinusoid source may be electrically coupled with the pulse modulator. Further, the sinusoid source may be configured for generating the sine wave signal of the fundamental frequency. Further, the generating of the pulse density modulated signal may be based on the generating of the sine wave signal. Further, the switching element may be electrically coupled to the primary winding. Further, the switching element may be connected in series with the primary winding. Further, the switching element may be electrically coupled with the pulse modulator. Further, the switching element may be configured to be switched between an on state and an off state based on the pulse density modulated signal. Further, the switching element allows a passage of current in the primary winding in the on state. Further, the switching element does not allow the passage of the current in the primary winding in the off state. Further, the analog low pass filtering stage may be electrically coupled to the secondary winding. Further, the analog low pass filtering stage may be configured for generating an AC voltage of the fundamental frequency based on attenuating a plurality of higher frequency components of an unfiltered AC voltage at the secondary winding.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
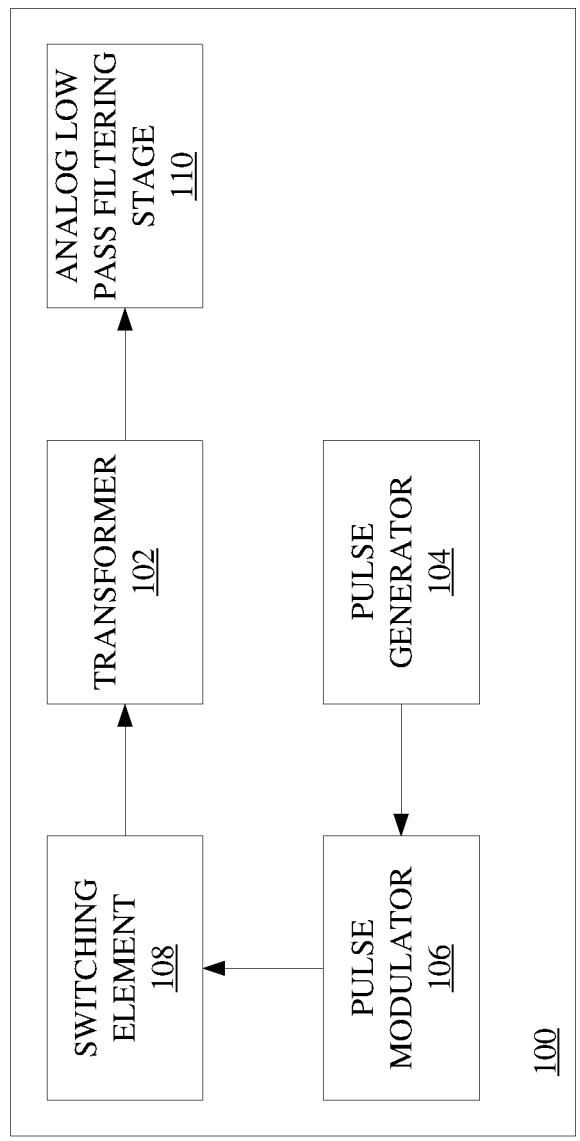
FIG. 1 is a bock diagram of a DC-AC converter, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a DC-AC converter, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Overview

The present disclosure describes a high-efficiency DC-AC inverter (converter). Further, the high-efficiency DC-AC inverter may be a high-performance sine wave inverter. Further, a THD (Total Harmonic Distortion) of an output sine wave generated by the high-efficiency DC-AC inverter may be less than 0.1%. Further, the high-efficiency DC-AC inverter may be a two-stage DC-AC converter. Further, the high-efficiency DC-AC inverter does not require a bridge rectifier and an H-bridge. Further, the high-efficiency DC-AC inverter does not include active components on a high voltage side of a transformer of the high-efficiency DC-AC inverter. Further, the high-efficiency DC-AC inverter may include only passive low pass filter components. Further, the high-efficiency DC-AC inverter may include an output low pass filter as harmonics are absent. Further, the high-efficiency DC-AC inverter may include a modular and scalable architecture. Further, the high-efficiency DC-AC inverter may use a digital noise shaping modulator in DC-AC conversion. Further, the high-efficiency DC-AC inverter may use PDM (Pulse Density Modulation). Further, the PDM may be used for direct sinusoid conversion. Further, the DC-AC conversion using the PDM may include three stages. Further, a first stage of the three stages may include inputting a low DC voltage. Further, a second stage of the three stages may include employing the PDM. Further, a third stage of the three stages may include outputting a high AC voltage. Further, the high-efficiency DC-AC inverter may use the PDM instead of PWM (Pulse Width Modulation). Further, the DC-AC conversion using the PWM may include five stages. Further, a first stage of the five stages may include inputting a low DC voltage. Further, a second stage of the five stages may include employing the PWM. Further, a third stage of five stages may include generating a high DC voltage. Further, a fourth stage of the five stages may include employing the PWM. Further, a fifth stage of the five stages may include outputting a high AC voltage.

Further, the present disclosure describes a design of the high-efficiency DC-AC inverter using minimal power conversion stages. Using an available DC input, a digital noise shaping modulator may be wired to generate a high-performance Pulse Density Modulated output which drives a low voltage side of a high-frequency transformer. A stepped-up pulsed output generated at an output of the high-frequency transformer may be low pass filtered by a passive low pass filter at the output of the high-frequency transformer to achieve a pure sinusoid high AC voltage. The pure sinusoid high AC voltage may be sampled by a closed-loop control system to maintain output voltage regulation.

Further, the present disclosure describes an electronic circuit system architecture for a DC-AC converter that generates a pure sinusoid high AC voltage using a low DC voltage from a battery. Further, the low DC voltage may be stepped up to the pure sinusoid high AC voltage.

Further, an architecture of the high-efficiency DC-AC inverter may be a single-stage oscillator DC-AC converter system. Further, the high-efficiency DC-AC inverter does not include active components such as switches, MOSFETs, etc., on a high voltage side of a transformer of the high-efficiency DC-AC inverter. Further, a pure sinusoid high AC voltage generated by the high-efficiency DC-AC inverter does not include signal harmonic tones. Further, the high-efficiency DC-AC inverter may include a modular and scalable architecture.

Further, the present disclosure describes a design of the high-efficiency DC-AC inverter using minimal power conversion stages. Further, a DC input from the battery may be connected to high power, high-frequency switch wired using an available DC input, and a digital noise shaping modulator may be wired to generate a high-performance Pulse Density Modulated output which drives a low voltage side of a high-frequency transformer. A stepped-up pulsed output generated at an output of the high-frequency transformer may be low pass filtered by a passive low pass filter at the output of the high-frequency transformer to achieve a pure sinusoid high AC voltage. The pure sinusoid high AC voltage may be sampled by a closed-loop control system to maintain voltage regulation.

Further, the present disclosure describes the high-efficiency DC-AC inverter. Further, the high-efficiency DC-AC inverter eliminates the need for a bridge rectifier and an HV (High Voltage) H-bridge. Further, a low pass filter of the high-efficiency DC-AC inverter may be required to attenuate the shaped noise at the output of the high-frequency transformer and thus relaxed. Further, an architecture of the shaped noise only and thus relaxed may be highly modular and scalable. Further, the efficiency of the high-efficiency DC-AC inverter may be greater due to reduced conversion losses. Further, a higher frequency implementation of the high-efficiency DC-AC inverter reduces an inverter's form factor drastically.

Further, the high-efficiency DC-AC inverter includes direct conversion of a low DC voltage to a pure sinusoid high AC voltage by means of a high-frequency PDM (Pulse Density Modulated) signal. High-frequency PDM pulses generated from a noise shaping modulator circuit of the high-efficiency DC-AC inverter with a high-resolution digital sinusoid at an input and an (N-level) pulse PDM output. Further, the (N-level) pulse PDM output may include a binary (2-level) or ternary (3-level) pulse PDM output. Further, the high-efficiency DC-AC inverter includes direct conversion of PDM signal to sinusoid by passive low pass filtering operation. Further, amplitude scaling of a high precision sinusoid at a modulator's input for line and load regulation of the high-efficiency DC-AC inverter.

Further, the present disclosure describes an inverter for generating a pure sinusoid high AC voltage. Further, the inverter may be characterized by a high-frequency pulse generator stage driving SW1 & SW2 switches at a low voltage (LV) side of a transformer. An analog Low Pass Filtering (LPF) stage at a high voltage (HV) side of the transformer. Voltage regulation via a feedback control loop. The high-frequency pulse generator comprising a sinusoidal source, a noise shaping modulator, and a ternary quantizer at the modulator output.

FIG. 1 is a bock diagram of a DC-AC converter 100, in accordance with some embodiments. Further, the DC-AC converter 100 may include a transformer 102, a pulse generator 104, a pulse modulator 106, a switching element 108, and an analog low pass filtering stage 110.

Further, the transformer 102 may include a primary winding and a secondary winding. Further, the transformer 102 may be a step-up transformer. Further, the primary winding may be electrically coupled to a DC voltage source. Further, the DC voltage source may include a battery.

Further, the pulse generator 104 may be configured for generating a plurality of pulses characterized by a pulse frequency. Further, the pulse frequency of the plurality of pulses may be in the order of 1 kHz to 100 MHz. Further, the pulse frequency of the plurality of pulses may be 100 kHz.

Further, the pulse modulator 106 may be electrically coupled with the pulse generator 104. Further, the pulse modulator 106 may be configured for generating a pulse density modulated signal based on modulating the plurality of pulses using a sine wave signal of a fundamental frequency. Further, the fundamental frequency of the sine wave signal may be 50 Hz, 60 Hz, etc. Further, the fundamental frequency may be constant or variable.

Further, the switching element 108 may be electrically coupled to the primary winding. Further, the switching element 108 may be connected in series with the primary winding. Further, the switching element 108 may be electrically coupled with the pulse modulator 106. Further, the switching element 108 may be configured to be switched between an on state and an off state based on the pulse density modulated signal. Further, the switching element 108 allows a passage of current in the primary winding in the on state. Further, the switching element 108 does not allow the passage of the current in the primary winding in the off state.

Further, the analog low pass filtering stage 110 may be electrically coupled to the secondary winding. Further, the analog low pass filtering stage 110 may be configured for generating an AC voltage of the fundamental frequency based on attenuating a plurality of higher frequency components of an unfiltered AC voltage at the secondary winding.

Figure 2:
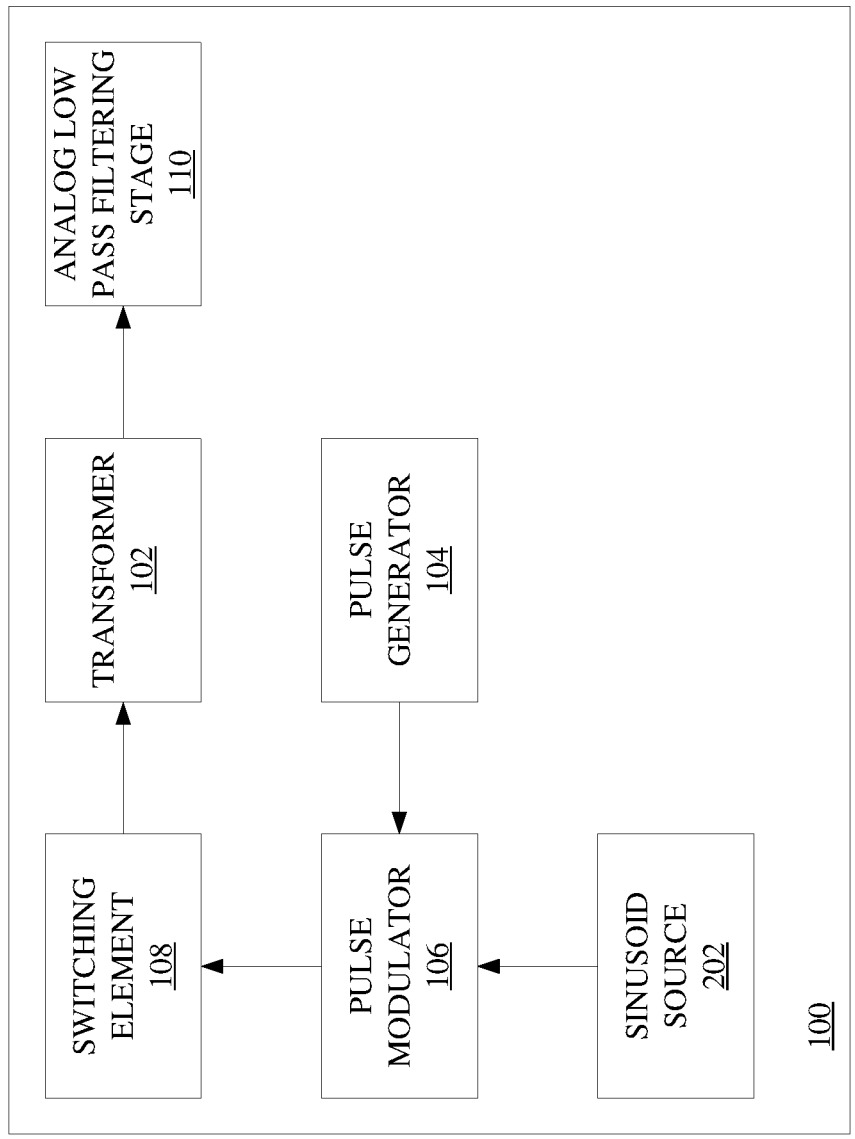
FIG. 2 is a block diagram of the DC-AC converter with the sinusoid source, in accordance with some embodiments.
Figure 3:
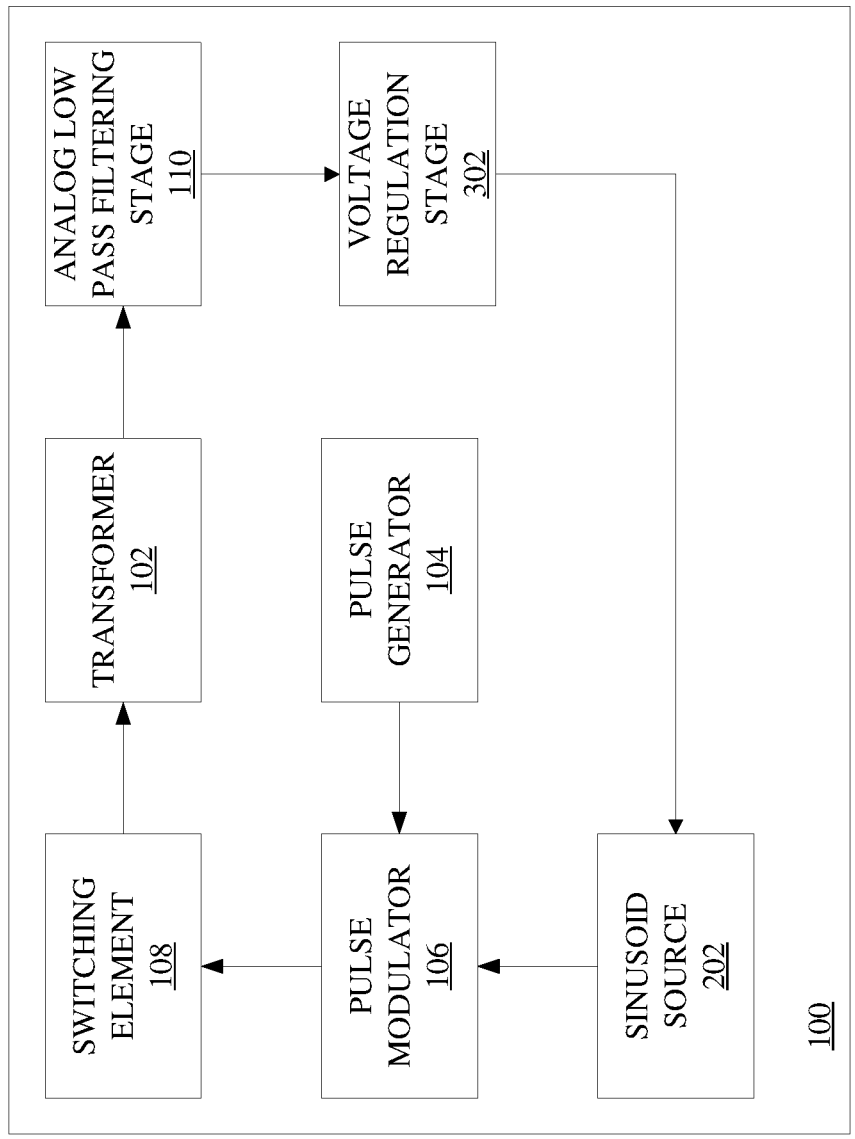
FIG. 3 is a block diagram of the DC-AC converter with the voltage regulation stage, in accordance with some embodiments.

In further embodiments, a sinusoid source 202, as shown in FIG. 2, may be electrically coupled with the pulse modulator 106. Further, the sinusoid source 202 may be configured for generating the sine wave signal of the fundamental frequency. Further, the sine wave signal may be a pulse code modulated signal. Further, the generating of the pulse density modulated signal may be based on the generating of the sine wave signal. In further embodiments, a voltage regulation stage 302, as shown in FIG. 3, may be electrically coupled to the analog low pass filtering stage 110 and the sinusoid source 202. Further, the voltage regulation stage 302 may be configured for generating a sampled AC voltage based on sampling the AC voltage. Further, the voltage regulation stage 302 may be configured for inputting the sampled AC voltage to the sinusoid source 202 based on the generating of the sampled AC voltage for regulating a voltage level of the AC voltage. Further, the generating of the sine wave signal of the fundamental frequency may be based on the sampled AC voltage.

Further, in some embodiments, the sine wave signal may include a digital sine wave signal. Further, the plurality of pulses may be modulated using the digital sine wave signal.

Further, in some embodiments, the analog low pass filtering stage 110 may be associated with a predetermined cutoff frequency. Further, the predetermined cutoff frequency may be the fundamental frequency. Further, the plurality of higher frequency components associated with a plurality of higher frequencies greater than the predetermined cutoff frequency may be attenuated.

Further, in some embodiments, the primary winding may include a plurality of input terminals. Further, the plurality of input terminals may include a first input terminal, a second input terminal, and a center tap. Further, the DC voltage source may be electrically coupled with the center tap for supplying a DC voltage to the transformer 102. Further, in an embodiment, the switching element 108 may include a first switching element and a second switching element. Further, the first switching element may be connected in series with the first input terminal and the second switching element may be connected in series with the second input terminal. Further, the first switching element allows the passage of the current in a first portion of the primary winding may include the first input terminal and the center tap in the on state. Further, the first switching element does not allow the passage of the current in the first portion of the primary winding in the off state. Further, the second switching element allows the passage of the current in a second portion of the winding may include the second input terminal and the center tap in the on state. Further, the second switching element does not allow the passage of the current in the second portion of the primary winding in the off state.

Further, the sinusoid source 202 may be configured for generating the sine wave signal of the fundamental frequency. Further, the generating of the pulse density modulated signal may be based on the generating of the sine wave signal. Further, in an embodiment, the AC voltage may be associated with a total harmonic distortion. Further, a value of the total harmonic distortion may be based on the pulse frequency of the plurality of pulses in relation to the fundamental frequency of the sine wave signal.

Figure 4:
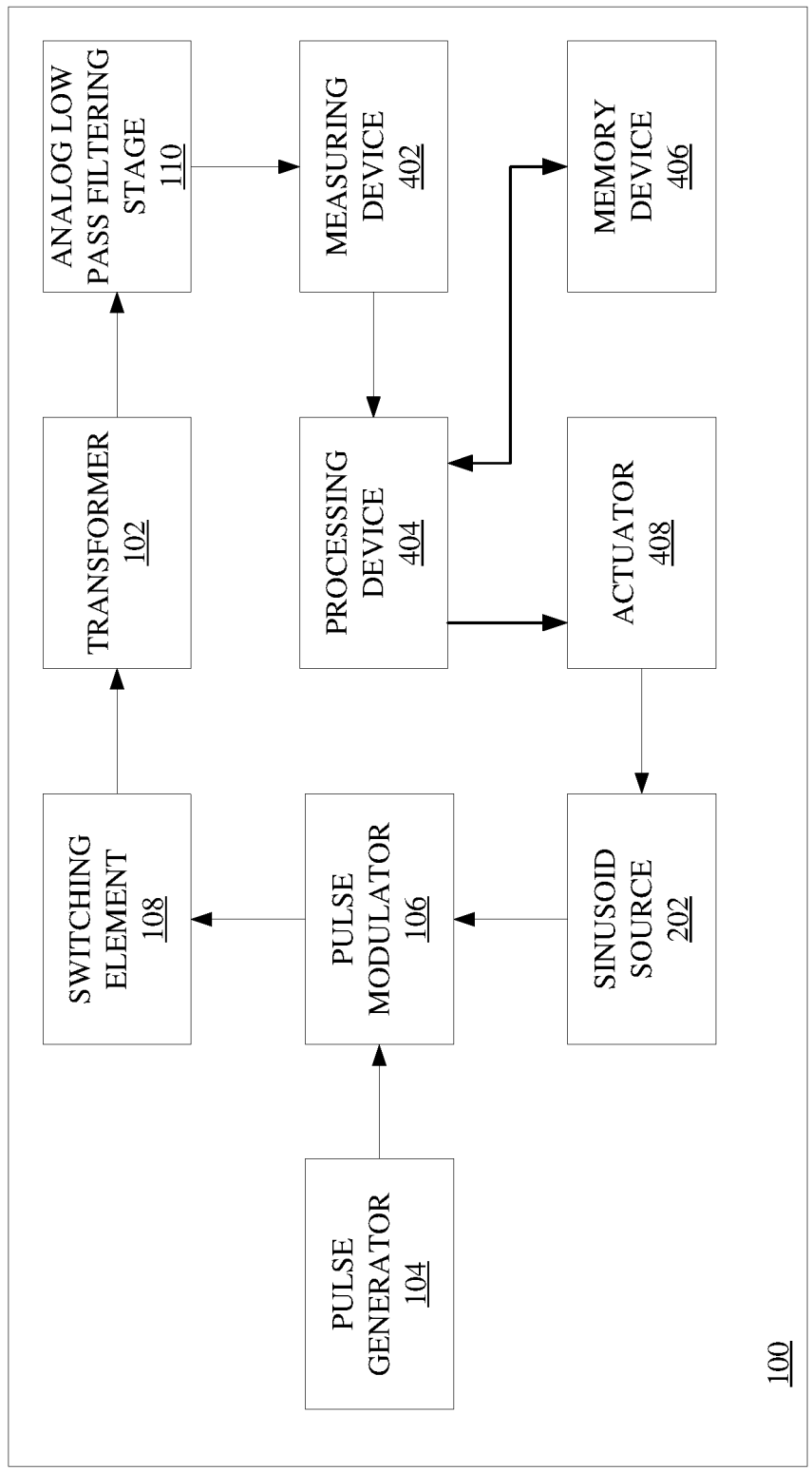
FIG. 4 is a block diagram of the DC-AC converter for facilitating management of the total harmonic distortion (THD) of the DC-AC converter, in accordance with some embodiments.

In further embodiments, the DC-AC converter 100 may further include a measuring device 402, a processing device 404, a memory device 406, and an actuator 408, as shown in FIG. 4. Further, the measuring device 402 may be electrically coupled with the analog low pass filtering stage 110. Further, the measuring device 402 may be configured for measuring the value of the THD. Further, the processing device 404 may be communicatively coupled with the measuring device 402. Further, the processing device 404 may be configured for comparing the value of the THD with a range of allowed values of the THD. Further, the range of allowed values of the THD may be a range of the THD values in the AC voltage that may be allowed in the AC voltage. Further, the processing device 404 may be configured for determining the pulse frequency of the plurality of pulses based on the comparing. Further, the processing device 404 may be configured for generating a command based on the determining of the pulse frequency. Further, the memory device 406 may be communicatively coupled with the processing device 404. Further, the memory device 406 may be configured for storing the range of allowed values of the THD. Further, the actuator 408 may be communicatively coupled with the processing device 404. Further, the actuator 408 may be operationally coupled with the sinusoid source 202. Further, the actuator 408 may be configured for configuring at least one operational parameter of the sinusoid source 202. Further, the generating of the sine wave signal of the fundamental frequency may be based on the configuring. Further, the at least one operational parameter corresponds to at least one sinusoid parameter of the sine wave signal. Further, the at least one sinusoid parameter may include a magnitude parameter, a frequency parameter, etc. Further, the THD depends on the at least one sinusoid parameter. Further, in an embodiment, the memory device 406 may be communicatively coupled with at least one user device. Further, the at least one user device may be configured for generating the range of allowed values of the THD. Further, the at least one user device may be configured for transmitting the range of allowed values of the THD to the memory device 406 based on the generating of the range of allowed values of the THD. Further, the storing of the range of allowed values of the THD may be based on the transmitting. Further, in an embodiment, the actuator 408 may be operationally coupled with the pulse generator 104. Further, the actuator 408 may be configured for configuring at least one operational parameter of the pulse generator 104. Further, the generating of the plurality of pulses characterized by the pulse frequency may be based on the configuring of the at least one operational parameter of the pulse generator 104. Further, the at least one operational parameter of the pulse generator 104 corresponds to a frequency parameter of the pulse frequency of the plurality of pulses. Further, the THD depends on the pulse frequency of the plurality of pulses.

Figure 5:
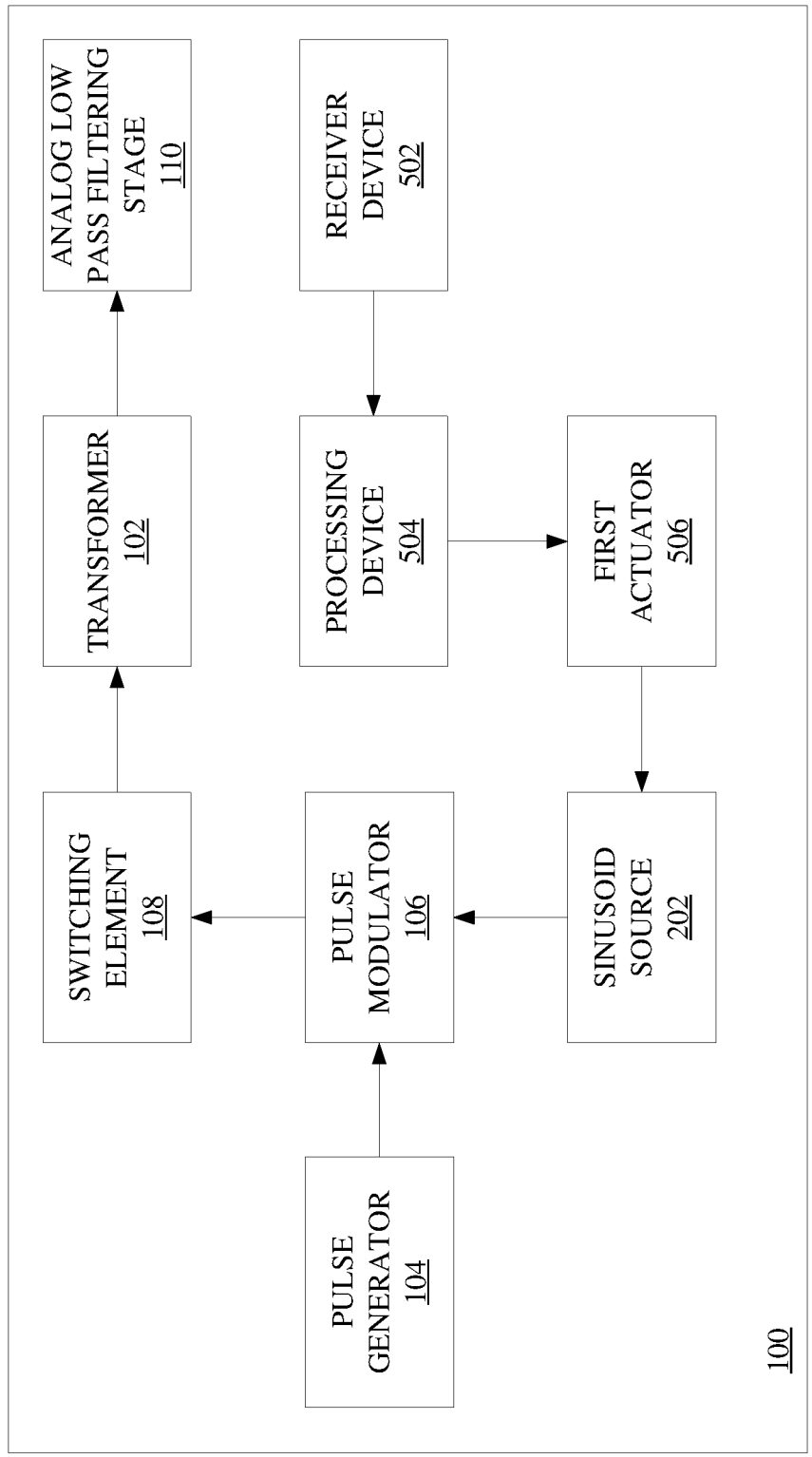
FIG. 5 is a block diagram of the DC-AC converter for facilitating management of the total harmonic distortion (THD) of the DC-AC converter based on the electrical load, in accordance with some embodiments.

In further embodiments, the DC-AC converter 100 may further include a receiver device 502, a processing device 504, and a first actuator 506, as shown in FIG. 5. Further, the receiver device 502 may be coupled to an electrical load. Further, the receiver device 502 may be configured for receiving at least one load requirement from the electrical load. Further, the processing device 504 may be communicatively coupled with the receiver device 502. Further, the processing device 504 may be configured for analyzing the at least one load requirement. Further, the processing device 504 may be configured for determining a range of required values of the THD for the electrical load based on the analyzing. Further, the range of required values of the THD may be a range of the THD values in the AC voltage that may be required by the electrical load. Further, the processing device 504 may be configured for determining the pulse frequency of the plurality of pulses based on the determining of the range of required values of the THD. Further, the processing device 504 may be configured for generating a first command based on the determining of the pulse frequency. Further, the first actuator 506 may be communicatively coupled with the processing device 504. Further, the first actuator 506 may be operationally coupled with the sinusoid source 202. Further, the first actuator 506 may be configured for configuring at least one operational parameter of the sinusoid source 202. Further, the generating of the sine wave signal of the fundamental frequency may be based on the configuring. Further, the at least one operational parameter corresponds to at least one sinusoid parameter of the sine wave signal. Further, the at least one sinusoid parameter may include a magnitude parameter, a frequency parameter, etc. Further, the THD depends on the at least one sinusoid parameter. Further, in an embodiment, the first actuator 506 may be operationally coupled with the pulse generator 104. Further, the first actuator 506 may be configured for configuring at least one operational parameter of the pulse generator 104. Further, the generating of the plurality of pulses characterized by the pulse frequency may be based on the configuring of the at least one operational parameter of the pulse generator 104. Further, the at least one operational parameter of the pulse generator 104 corresponds to a frequency parameter of the pulse frequency of the plurality of pulses. Further, the THD depends on the pulse frequency of the plurality of pulses.

Figure 6:
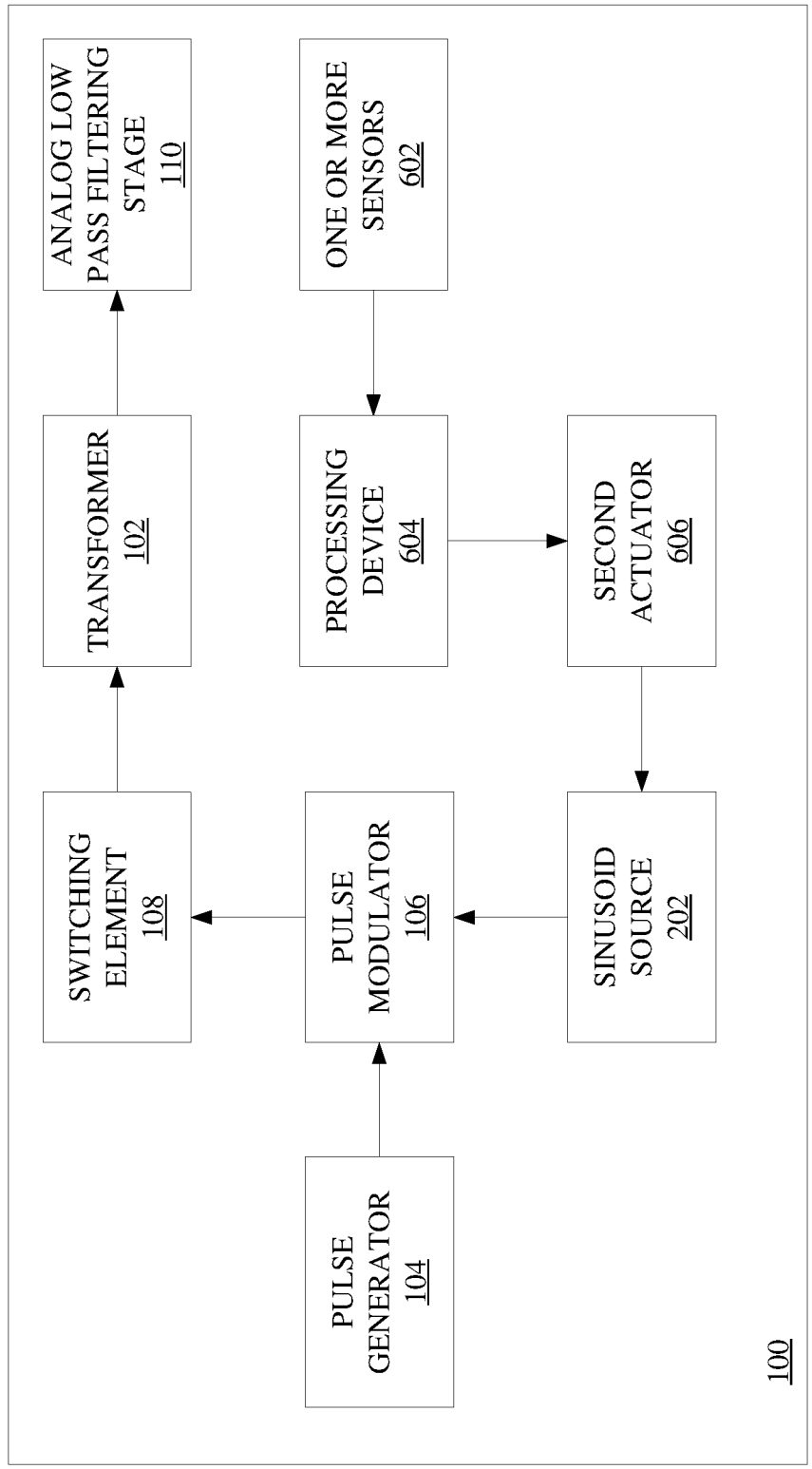
FIG. 6 is a block diagram of the DC-AC converter for facilitating management of the total harmonic distortion (THD) of the DC-AC converter based on environment factors, in accordance with some embodiments.

In further embodiments, the DC-AC converter 100 may further include one or more sensors 602, a processing device 604, and a second actuator 606, as shown in FIG. 6. Further, the one or more sensors 602 may be configured for generating one or more sensor data based on one or more variables associated with the DC-AC converter 100. Further, the processing device 604 may be communicatively coupled with the one or more sensors 602. Further, the processing device 604 may be configured for analyzing the one or more sensor data. Further, the processing device 604 may be configured for determining at least one operational condition of the DC-AC converter 100 based on the analyzing. Further, the processing device 604 may be configured for determining a range of required values of the THD based on the determining of the at least one operational condition. Further, the processing device 604 may be configured for determining the pulse frequency of the plurality of pulses based on the determining of the range of required values of the THD. Further, the processing device 604 may be configured for generating a second command based on the determining of the pulse frequency. Further, the second actuator 606 may be communicatively coupled with the processing device 604. Further, the second actuator 606 may be operationally coupled with the sinusoid source 202. Further, the second actuator 606 may be configured for configuring at least one operational parameter of the sinusoid source 202. Further, the generating of the sine wave signal of the fundamental frequency may be based on the configuring. Further, the at least one operational parameter corresponds to at least one sinusoid parameter of the sine wave signal. Further, the at least one sinusoid parameter may include a magnitude parameter, a frequency parameter, etc. Further, the THD depends on the at least one sinusoid parameter. Further, in an embodiment, the second actuator 606 may be operationally coupled with the pulse generator 104. Further, the second actuator 606 may be configured for configuring at least one operational parameter of the pulse generator 104. Further, the generating of the plurality of pulses characterized by the pulse frequency may be based on the configuring of the at least one operational parameter of the pulse generator 104. Further, the at least one operational parameter of the pulse generator 104 corresponds to a frequency parameter of the pulse frequency of the plurality of pulses. Further, the THD depends on the pulse frequency of the plurality of pulses.

FIG. 2 is a block diagram of the DC-AC converter 100 with the sinusoid source 202, in accordance with some embodiments.

FIG. 3 is a block diagram of the DC-AC converter 100 with the voltage regulation stage 302, in accordance with some embodiments.

FIG. 4 is a block diagram of the DC-AC converter 100 for facilitating management of the total harmonic distortion (THD) of the DC-AC converter 100, in accordance with some embodiments.

FIG. 5 is a block diagram of the DC-AC converter 100 for facilitating management of the total harmonic distortion (THD) of the DC-AC converter 100 based on the electrical load, in accordance with some embodiments.

FIG. 6 is a block diagram of the DC-AC converter 100 for facilitating management of the total harmonic distortion (THD) of the DC-AC converter 100 based on environment factors, in accordance with some embodiments.

Figure 7:
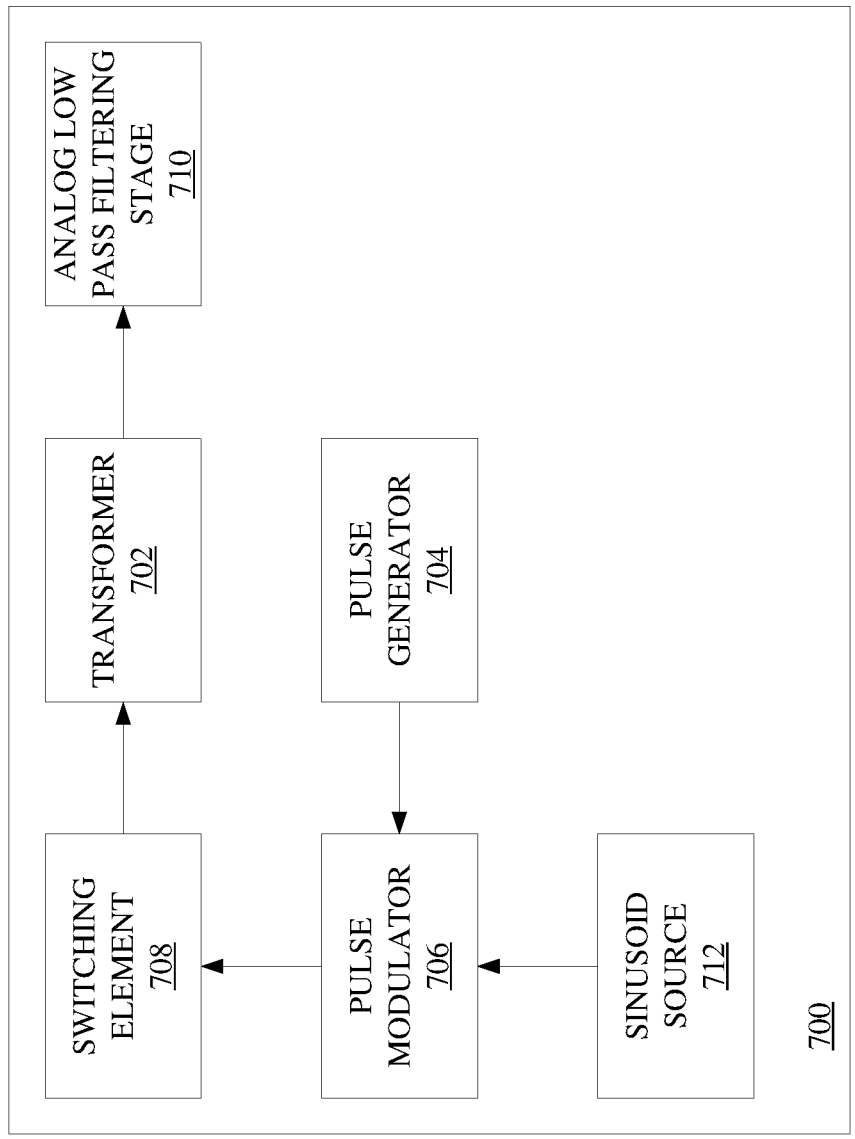
FIG. 7 is a block diagram of a DC-AC converter, in accordance with some embodiments.

FIG. 7 is a block diagram of a DC-AC converter 700, in accordance with some embodiments. Further, the DC-AC converter 700 may include a transformer 702, a pulse generator 704, a pulse modulator 706, a sinusoid source 712, a switching element 708, and an analog low pass filtering stage 710.

Further, the transformer 702 may include a primary winding and a secondary winding. Further, the transformer 702 may be a step-up transformer. Further, the primary winding may be electrically coupled to a DC voltage source.

Further, the pulse generator 704 may be configured for generating a plurality of pulses characterized by a pulse frequency.

Further, the pulse modulator 706 may be electrically coupled with the pulse generator 704. Further, the pulse modulator 706 may be configured for generating a pulse density modulated signal based on modulating the plurality of pulses using a sine wave signal of a fundamental frequency.

Further, the sinusoid source 712 may be electrically coupled with the pulse modulator 706. Further, the sinusoid source 712 may be configured for generating the sine wave signal of the fundamental frequency. Further, the generating of the pulse density modulated signal may be based on the generating of the sine wave signal.

Further, the switching element 708 may be electrically coupled to the primary winding. Further, the switching element 708 may be connected in series with the primary winding. Further, the switching element 708 may be electrically coupled with the pulse modulator 706. Further, the switching element 708 may be configured to be switched between an on state and an off state based on the pulse density modulated signal. Further, the switching element 708 allows a passage of current in the primary winding in the on state. Further, the switching element 708 does not allow the passage of the current in the primary winding in the off state.

Further, the analog low pass filtering stage 710 may be electrically coupled to the secondary winding. Further, the analog low pass filtering stage 710 may be configured for generating an AC voltage of the fundamental frequency based on attenuating a plurality of higher frequency components of an unfiltered AC voltage at the secondary winding.

Figure 8:
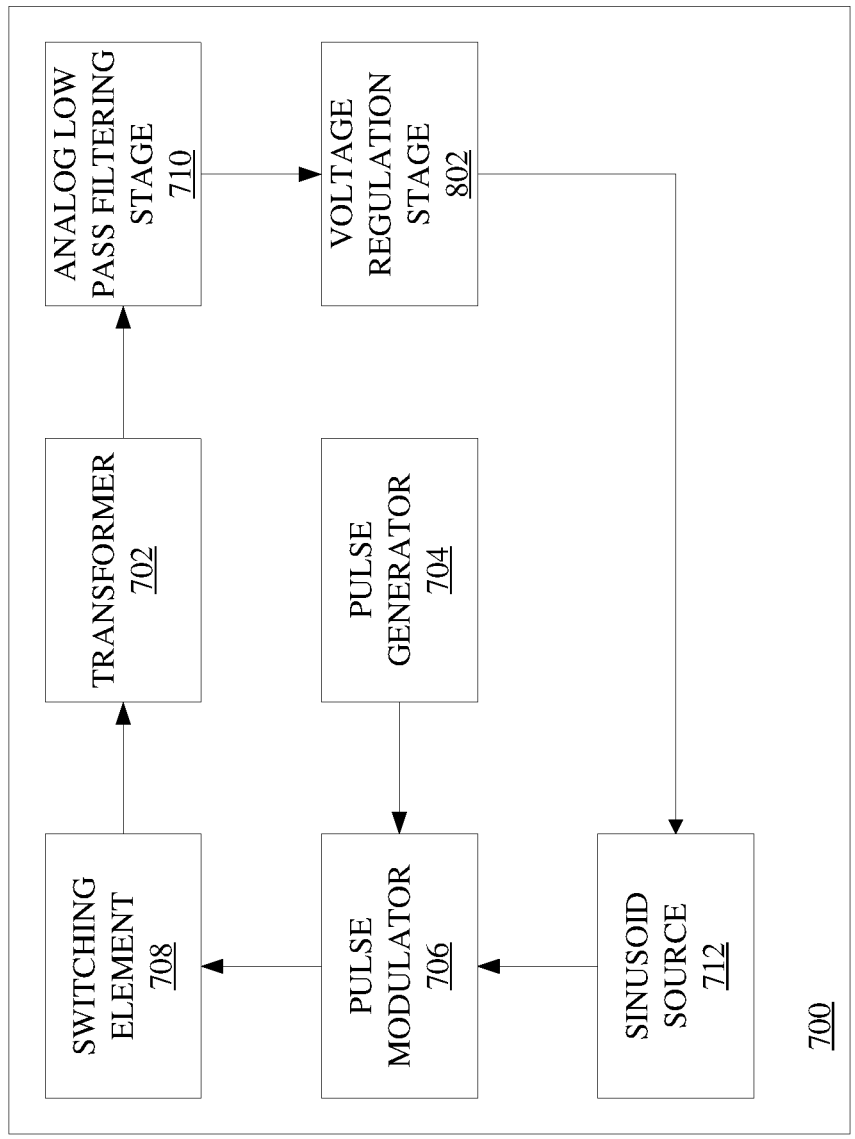
FIG. 8 is a block diagram of the DC-AC converter with the voltage regulation stage, in accordance with some embodiments.

In further embodiments, a voltage regulation stage 802, as shown in FIG. 8, may be electrically coupled to the analog low pass filtering stage 710 and the sinusoid source 712. Further, the voltage regulation stage 802 may be configured for generating a sampled AC voltage based on sampling the AC voltage. Further, the voltage regulation stage 802 may be configured for inputting the sampled AC voltage to the sinusoid source 712 based on the generating of the sampled AC voltage for regulating a voltage level of the AC voltage. Further, the generating of the sine wave signal of the fundamental frequency may be based on the sampled AC voltage.

Further, in some embodiments, the sine wave signal may include a digital sine wave signal. Further, the plurality of pulses may be modulated using the digital sine wave signal.

Further, in some embodiments, the analog low pass filtering stage 710 may be associated with a predetermined cutoff frequency. Further, the predetermined cutoff frequency may be the fundamental frequency. Further, the plurality of higher frequency components associated with a plurality of higher frequencies greater than the predetermined cutoff frequency may be attenuated.

Further, in some embodiments, the primary winding may include a plurality of input terminals. Further, the plurality of input terminals may include a first input terminal, a second input terminal, and a center tap. Further, the DC voltage source may be electrically coupled with the center tap for supplying a DC voltage to the transformer 702. Further, in an embodiment, the switching element 708 may include a first switching element and a second switching element. Further, the first switching element may be connected in series with the first input terminal and the second switching element may be connected in series with the second input terminal. Further, the first switching element allows the passage of the current in a first portion of the primary winding may include the first input terminal and the center tap in the on state. Further, the first switching element does not allow the passage of the current in the first portion of the primary winding in the off state. Further, the second switching element allows the passage of the current in a second portion of the winding may include the second input terminal and the center tap in the on state. Further, the second switching element does not allow the passage of the current in the second portion of the primary winding in the off state.

Further, in some embodiments, the AC voltage may be associated with a total harmonic distortion. Further, a value of the total harmonic distortion may be based on the pulse frequency of the plurality of pulses in relation to the fundamental frequency of the sine wave signal.

Figure 9:
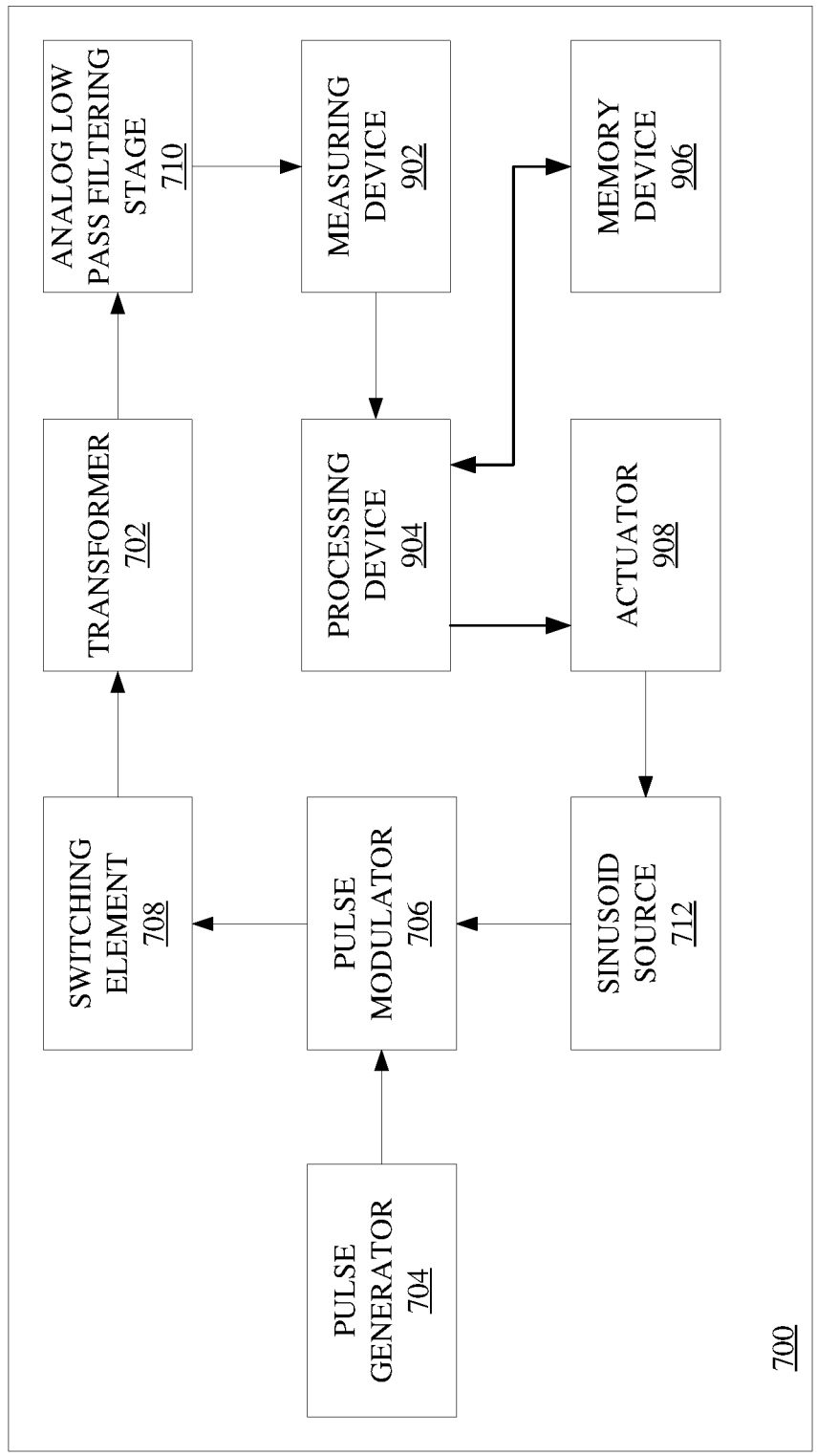
FIG. 9 is a block diagram of the DC-AC converter for facilitating management of the total harmonic distortion (THD) of the DC-AC converter, in accordance with some embodiments.

In further embodiments, the DC-AC converter 700 may further include a measuring device 902, a processing device 904, a memory device 906, and an actuator 908, as shown in FIG. 9. Further, the measuring device 902 may be electrically coupled with the analog low pass filtering stage 710. Further, the measuring device 902 may be configured for measuring the value of the THD. Further, the processing device 904 may be communicatively coupled with the measuring device 902. Further, the processing device 904 may be configured for comparing the value of the THD with a range of allowed values of the THD. Further, the processing device 904 may be configured for determining the pulse frequency of the plurality of pulses based on the comparing. Further, the processing device 904 may be configured for generating a command based on the determining of the pulse frequency. Further, the memory device 906 may be communicatively coupled with the processing device 904. Further, the memory device 906 may be configured for storing the range of allowed values of the THD. Further, the actuator 908 may be communicatively coupled with the processing device 904. Further, the actuator 908 may be operationally coupled with the sinusoid source 712. Further, the actuator 908 may be configured for configuring at least one operational parameter of the sinusoid source 712. Further, the generating of the sine wave signal of the fundamental frequency may be based on the configuring. Further, the at least one operational parameter corresponds to at least one sinusoid parameter of the sine wave signal. Further, the at least one sinusoid parameter may include a magnitude parameter, a frequency parameter, etc.

FIG. 8 is a block diagram of the DC-AC converter 700 with the voltage regulation stage 802, in accordance with some embodiments.

FIG. 9 is a block diagram of the DC-AC converter 700 for facilitating management of the total harmonic distortion (THD) of the DC-AC converter 700, in accordance with some embodiments.

Figure 10:
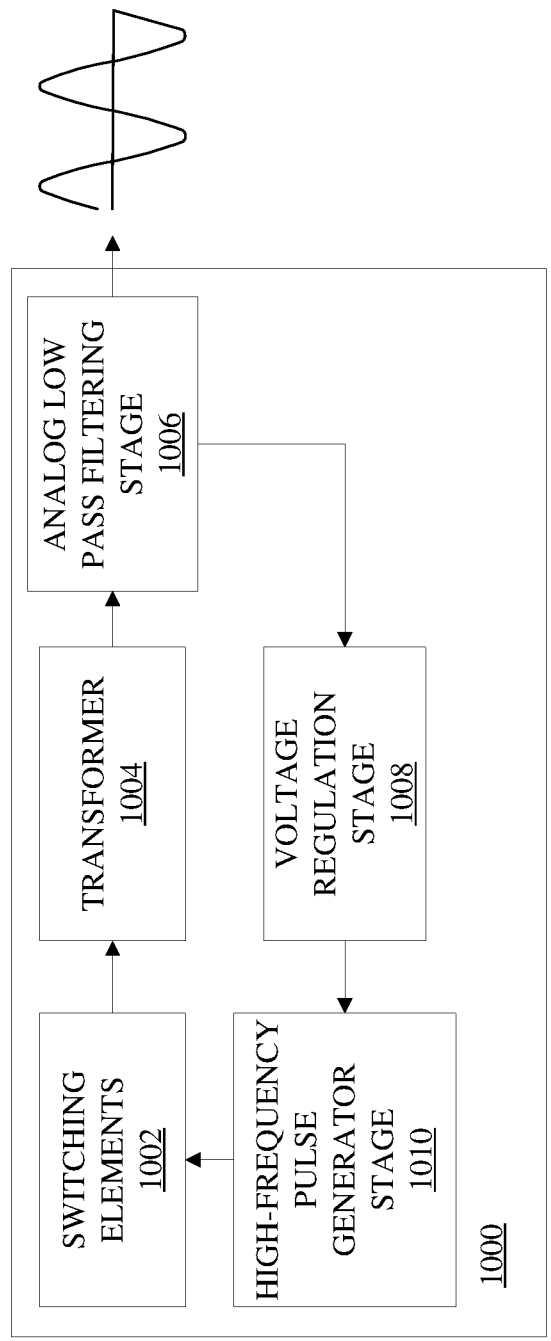
FIG. 10 is a block diagram of a high-efficiency DC-AC inverter, in accordance with some embodiments.

FIG. 10 is a block diagram of a high-efficiency DC-AC inverter 1000, in accordance with some embodiments. Further, the high-efficiency DC-AC inverter 1000 (such as the DC-AC converter 100, DC-AC converter 700, etc.) may be configured for converting a DC voltage to an AC voltage using minimal power conversion stages. Further, the AC voltage may be a pure sinusoid high AC voltage. Further, a THD (Total Harmonic distortion) associated with the AC voltage may be less than 0.01%. Further, the DC voltage may be a low DC voltage. Further, the high-efficiency DC-AC inverter 1000 may include a high-frequency pulse generator stage 1010, a transformer 1004, a plurality of switching elements 1002, an analog low pass filtering stage 1006, and a voltage regulation stage 1008.

Further, the high-frequency pulse generator stage 1010 may be configured for generating a pulse density modulated (PDM) output signal using a pulse density modulation scheme. Further, the high-frequency pulse generator stage 1010 may be configured for generating a plurality of pulses characterized by a pulse frequency. Further, the high-frequency pulse generator stage 1010 may be configured for modulating the plurality of pulses using a sine wave signal of a fundamental frequency. Further, the generating of the PDM output signal may be based on the modulating. Further, the sine wave signal may include a digital sine wave signal. Further, the pulse density modulated output signal may include high-frequency PDM pulses.

Further, the transformer 1004 may be electrically coupled with a DC voltage source. Further, the DC voltage source may be configured for generating the DC voltage at an output terminal of the DC voltage source. Further, the DC voltage may be associated with an input voltage level. Further, the DC voltage may include the low DC voltage. Further, the DC voltage source may be a battery. Further, the transformer 1004 may be a high-frequency transformer. Further, the transformer 1004 may be a step-up transformer. Further, the transformer 1004 may include a primary side and a secondary side. Further, the primary side corresponds to a primary winding of the transformer 1004 and the secondary side corresponds to a secondary winding of the transformer 1004. Further, the primary side may be a low voltage side and the secondary side may be a high voltage side. Further, the primary side of the transformer 1004 may include a plurality of input terminals. Further, the plurality of input terminals of the transformer 1004 may include a first input end terminal, a second input end terminal, and a center tap. Further, the center tap may be electrically coupled with the output terminal of the DC voltage source. Further, the transformer 1004 receives the DC voltage at the center tap from the DC voltage source.

Further, the plurality of switching elements 1002 may be electrically coupled to the low voltage side of the transformer 1004. Further, the plurality of switching elements 1002 may include a first switching element and a second switching element. Further, the first switching element may be configured for controllably connecting the first input end terminal to a ground. Further, the second switching element may be configured for controllably connecting the second input end terminal to the ground. Further, the plurality of switching elements 1002 may be operationally coupled with an output terminal of the high-frequency pulse generator stage 1010. Further, the high-frequency pulse generator stage 1010 may be configured for driving the plurality of switching elements 1002. Further, the plurality of switching elements 1002 may be configured for switching between a plurality of switching states based on the pulse density modulated output signal. Further, the plurality of switching states may include a connected state and a disconnected state. Further, the first switching element may connect the first input end terminal to the ground in the connected state of the first switching element. Further, the first switching element may disconnect the first input end terminal from the ground in the disconnected state of the first switching element. Further, the second switching element may connect the second input end terminal to the ground in the connected state of the second switching element. Further, the second switching element may disconnect the second input end terminal from the ground in the disconnected state of the second switching element. Further, the transformer 1004 may be configured for transforming the DC voltage to an unfiltered AC voltage based on the switching. Further, the unfiltered AC voltage may include a plurality of higher frequency components. Further, the plurality of higher frequency components may be associated with a plurality of higher frequencies greater than a fundamental frequency of the unfiltered AC voltage. Further, the transformer 1004 generates the unfiltered AC voltage at a plurality of output terminals of the secondary side of the transformer 1004 based on the transforming. Further, the unfiltered AC voltage may be associated with an output voltage level. Further, the output voltage level may be greater than the input voltage level.

Further, the analog low pass filtering stage 1006 may include a plurality of input terminals and a plurality of output terminals. Further, the plurality input terminals of the analog low pass filtering stage 1006 may be electrically coupled with the plurality of output terminals of the transformer 1004. Further, the analog low pass filtering stage 1006 may be configured for attenuating the plurality of higher frequency components of the unfiltered AC voltage. Further, the analog low pass filtering stage 1006 attenuates the plurality of higher frequency components comprising the plurality of higher frequencies greater than a predetermined cutoff frequency of the analog low pass filtering stage 1006. Further, the analog low pass filtering stage 1006 may be configured for generating the AC voltage at the plurality of output terminals of the analog low pass filtering stage 1006 based on the attenuating. Further, the AC voltage may be a filtered AC voltage. Further, the AC voltage may be associated with the fundamental frequency. Further, the analog low pass filtering stage 1006 may include at least one passive low pass filtering element. Further, the analog low pass filtering stage 1006 may include an LC filter.

Further, the voltage regulation stage 1008 may include an input terminal and an output terminal. Further, the input terminal of the voltage regulation stage 1008 may be electrically coupled with the plurality of output terminals of the analog low pass filtering stage 1006 and the output terminal of the voltage regulation stage 1008 may be coupled with the high-frequency pulse generator stage 1010 for forming a feedback control loop. Further, the voltage regulation stage 1008 may include a voltage sampler. Further, the voltage sampler may be configured for sampling the AC voltage. Further, the voltage sampler may be configured for generating a sampled AC voltage at the output terminal of the voltage regulation stage 1008 based on the sampling. Further, the high-frequency pulse generator stage 1010 may be configured for generating the pulse density modulated output signal based on the sampled AC voltage.

Further, in some embodiments, the pulse density modulated output signal may be associated with a plurality of voltage levels. Further, the plurality of voltage levels may include a first voltage level, a second voltage level, and a third voltage level. Further, the first switching element may switch to the connected state and the second switching element may switch to the disconnected state based on a transition of the pulse density modulated output signal to the first voltage level. Further, the first switching element may switch to the disconnected state and the second switching element may switch to the disconnected state based on a transition of the pulse density modulated output signal to the second voltage level. Further, the first switching element may switch to the disconnected state and the second switching element may switch to the connected state based on a transition of the pulse density modulated output signal to the third voltage level.

Figure 11:
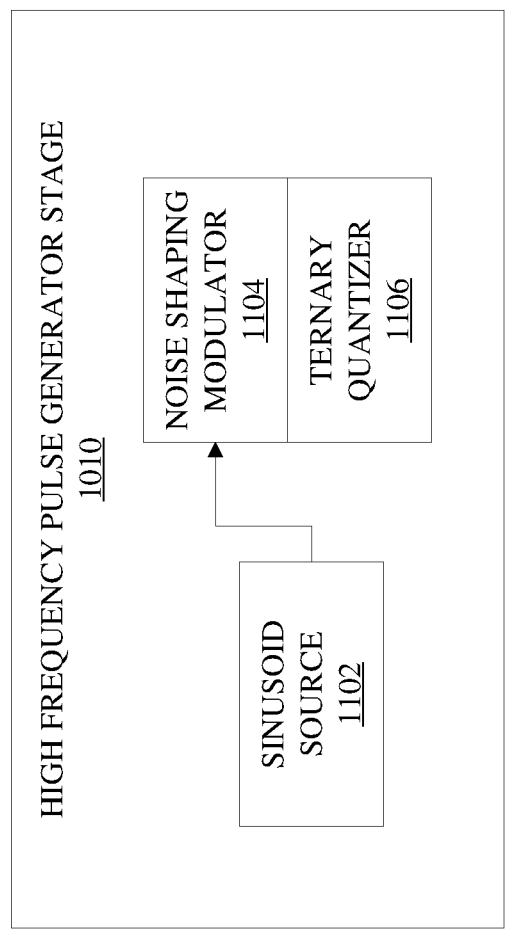
FIG. 11 is a block diagram of the high-frequency pulse generator stage of the high-efficiency DC-AC inverter, in accordance with some embodiments.

FIG. 11 is a block diagram of the high-frequency pulse generator stage 1010 of the high-efficiency DC-AC inverter 1000, in accordance with some embodiments. Further, the high-frequency pulse generator stage 1010 may include a sinusoid source 1102 and a noise shaping modulator 1104.

Further, the sinusoid source 1102 may be configured for generating a digital sine wave signal. Further, the sinusoid source 1102 may be a high precision sinusoid source. Further, the sinusoid source 1102 may include an amplitude control mechanism for controlling the amplitude of the digital sine wave signal.

Further, the noise shaping modulator 1104 may be electrically coupled with the sinusoid source 1102. Further, the noise shaping modulator 1104 may be a high order oversampling noise-shaping modulator. Further, the noise shaping modulator 1104 may include a ternary quantizer 1106. Further, the noise shaping modulator 1104 may be configured for modulating a plurality of pulses characterized by a pulse frequency using the digital sine wave signal. Further, the noise shaping modulator 1104 may be configured for generating the plurality of pulses characterized by a pulse frequency. Further, the noise shaping modulator 1104 may be configured for generating the pulse density modulated output signal based on the modulating.

Figure 12:
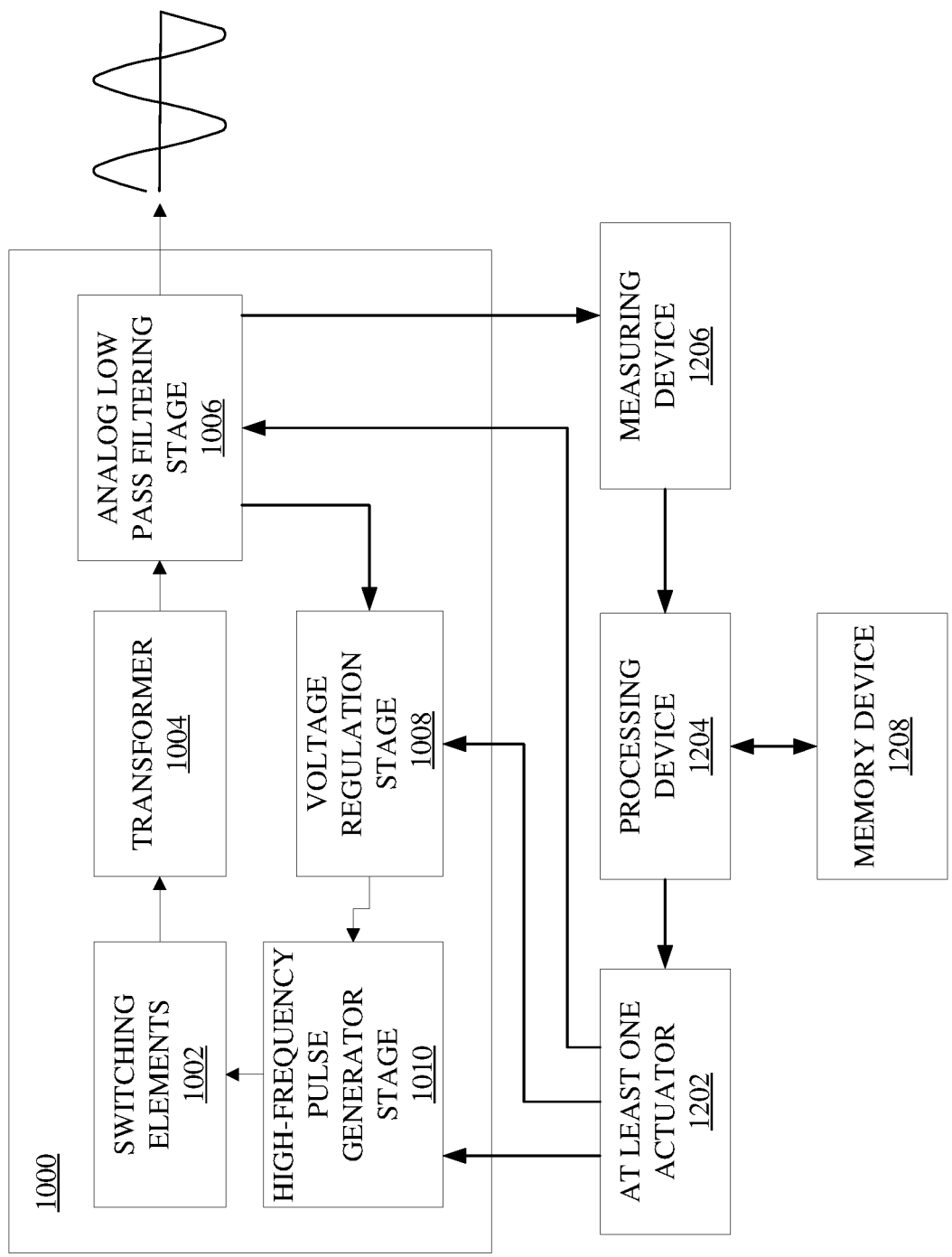
FIG. 12 is a block diagram of a system for facilitating management of a total harmonic distortion (THD) of the high-efficiency DC-AC inverter, in accordance with some embodiments.

FIG. 12 is a block diagram of a system for facilitating management of a total harmonic distortion (THD) of the high-efficiency DC-AC inverter 1000, in accordance with some embodiments. Further, the system may include a measuring device 1206, a processing device 1204, a memory device 1208, at least one actuator 1202, and the high-efficiency DC-AC inverter 1000.

Further, the measuring device 1206 may be electrically coupled with the plurality of output terminals of the analog low pass filtering stage 1006 of the high-efficiency DC-AC inverter 1000. Further, the measuring device 1206 may be configured for measuring the total harmonic distortion (THD) associated with the AC voltage generated by the high-efficiency DC-AC inverter 1000. Further, the measuring device 1206 may be configured for generating a value of the THD of the AC voltage based on the measuring.

Further, the processing device 1204 may be communicatively coupled with the measuring device 1206. Further, the processing device 1204 may be configured for comparing the value of the THD with an optimal value of the THD. Further, the optimal value may include a range of optimal THD values. Further, the range of the optimal THD values may include a lower optimal value limit and an upper optimal value limit. Further, the processing device 1204 may be configured for generating at least one command based on the comparing.

Further, the memory device 1208 may be communicatively coupled with the processing device 1204. Further, the memory device 1208 may be configured for storing the optimal value of the THD.

Further, the at least one actuator 1202 may be communicatively coupled with the processing device 1204. Further, the at least one actuator 1202 may be operationally coupled with at least one of the high-frequency pulse generator stage 1010, the analog low pass filtering stage 1006, and the voltage regulation stage 1008 of the high-efficiency DC-AC inverter 1000. Further, the at least one actuator 1202 may be configured for configuring at least one operational parameter of the at least one of the high-frequency pulse generator stage 1010, the analog low pass filtering stage 1006, and the voltage regulation stage 1008 based on the at least one command. Further, the configuring of the at least one operational parameter may change the value of the THD of the AC voltage to the optimal value of the THD of the AC voltage. Further, the at least one operational parameter may be associated with a loss value of losses in the high-efficiency DC-AC inverter 1000. Further, the loss value may inversely proportional to the THD value. Further, a decrease in the THD value leads to an increase in the loss value. Further, the increase in the loss value leads to a decrease in the efficiency of the high-efficiency DC-AC inverter 1000. Further, the value of THD may be traded against the loss value of the losses in the high-efficiency DC-AC inverter 1000.

Further, in some embodiments, at least one user device may be communicatively coupled with the memory device 1208. Further, the at least one user device may be configured for generating the optimal value of the THD. Further, the at least one user device may be configured for transmitting the optimal value of the THD to the memory device 1208. Further, the at least one user device may be associated with at least one user. Further, the at least one user may be an individual, an institution, an organization, etc. Further, the at least one user device may include a computing device such as, but not limited to, a smartphone, a tablet, a smartwatch, a laptop, a desktop, and so on. Further, the memory device 1208 may be configured of storing the optimal value.

Figure 13:
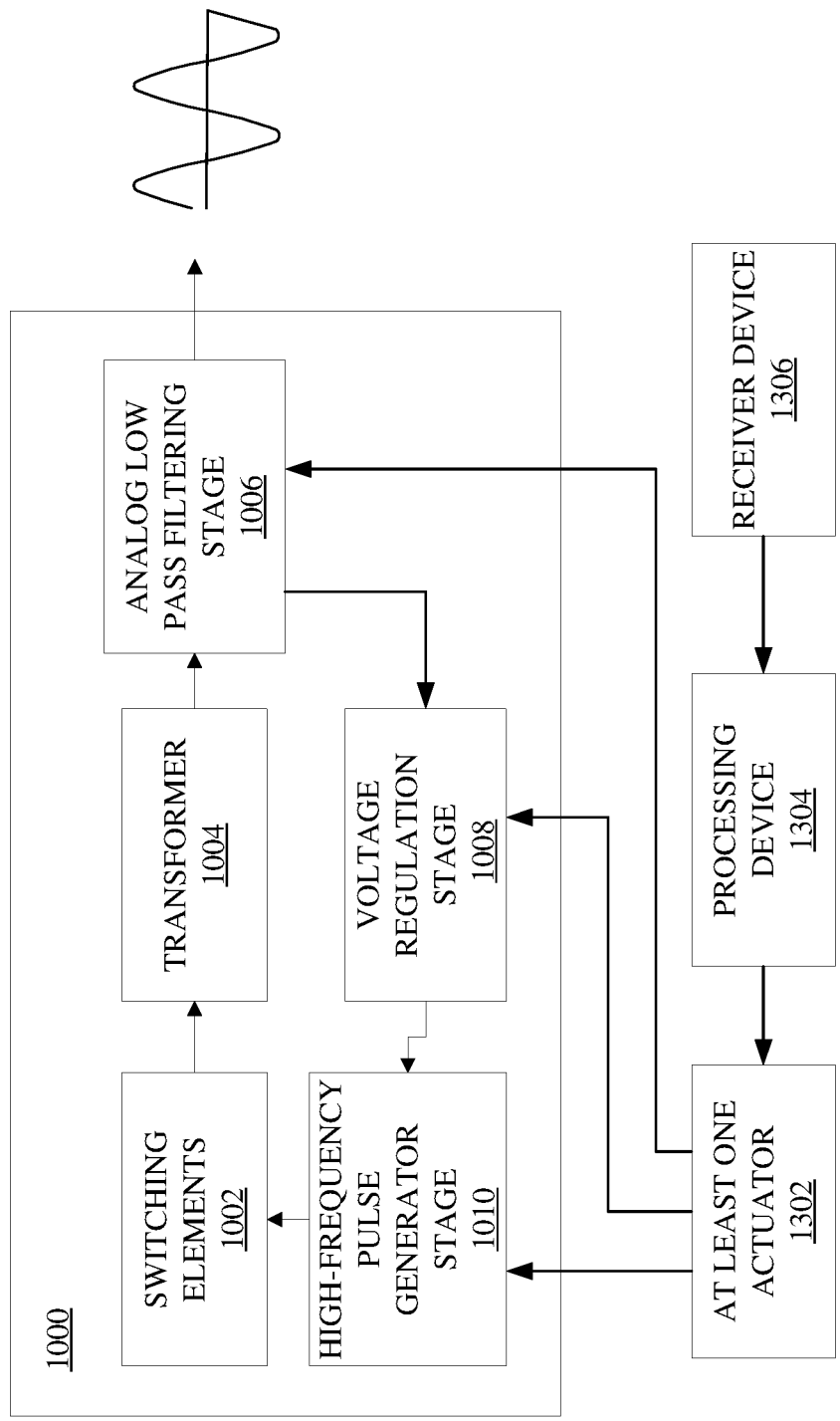
FIG. 13 is a block diagram of a system for facilitating management of a total harmonic distortion (THD) of the high-efficiency DC-AC inverter based on an electrical load, in accordance with some embodiments.

FIG. 13 is a block diagram of a system for facilitating management of a total harmonic distortion (THD) of the high-efficiency DC-AC inverter 1000 based on an electrical load, in accordance with some embodiments. Further, the system may include a receiver device 1306, a processing device 1304, at least one actuator 1302, and the high-efficiency DC-AC inverter 1000.

Further, the receiver device 1306 may be coupled to the electrical load. Further, the receiver device 1306 may be configured for receiving at least one load requirement from the electrical load over at least one of a wired communication channel and a wireless communication channel.

Further, the processing device 1304 may be communicatively coupled with the receiver device 1306. Further, the processing device 1304 may be configured for analyzing the at least one load requirement. Further, the processing device 1304 may be configured for determining a required value of the THD associated with the AC voltage generated by the high-efficiency DC-AC inverter 1000 based on the analyzing. Further, the processing device 1304 may be configured for generating at least one first command based on the determining.

Further, the at least one actuator 1302 may be communicatively coupled with the processing device 1304. Further, the at least one actuator 1302 may be operationally coupled with at least one of the high-frequency pulse generator stage 1010, the analog low pass filtering stage 1006, and the voltage regulation stage 1008 of the high-efficiency DC-AC inverter 1000. Further, the at least one actuator 1302 may be configured for configuring at least one operational parameter of the at least one of the high-frequency pulse generator stage 1010, the analog low pass filtering stage 1006, and the voltage regulation stage 1008 based on the at least one first command. Further, a value of the THD changes to the required value of the THD based on the configuring.

Figure 14:
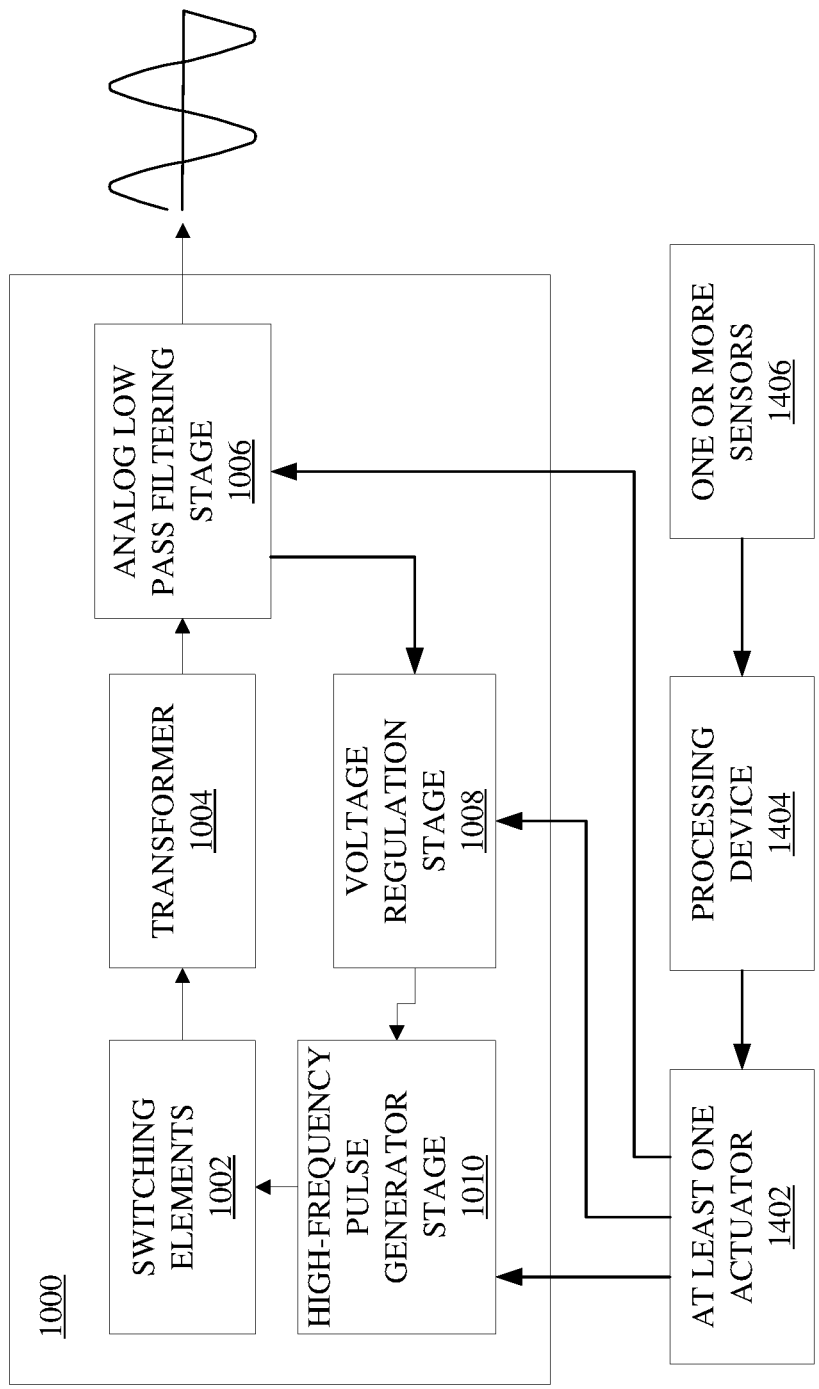
FIG. 14 is a block diagram of a system for facilitating management of a total harmonic distortion (THD) of the high-efficiency DC-AC inverter based on a context, in accordance with some embodiments.

FIG. 14 is a block diagram of a system for facilitating management of a total harmonic distortion (THD) of the high-efficiency DC-AC inverter 1000 based on a context, in accordance with some embodiments. Further, the system may include one or more sensors 1406, a processing device 1404, at least one actuator 1402, and the high-efficiency DC-AC inverter 1000.

Further, the one or more sensors 1406 may be configured for generating one or more sensor data based on one or more variables associated with the high-efficiency DC-AC inverter 1000. Further, the one or more sensors 1406 may include a location sensor, an environment sensor, an internal sensor, etc. Further, the internal sensor may include an internal temperature sensor, an interference sensor, etc. Further, the one or more variables may include a location, an environmental parameter (such as temperature, pressure, etc.), a temperature of the high-efficiency DC-AC inverter 1000, an electromagnetic noise, etc.

Further, the processing device 1404 may be communicatively coupled with the one or more sensors 1406. Further, the processing device 1404 may be configured for analyzing the one or more sensor data. Further, the processing device 1404 may be configured for determining the context associated with an operation of the high-efficiency DC-AC inverter 1000. Further, the processing device 1404 may be configured for generating at least one second command based on the determining.

Further, the at least one actuator 1402 may be communicatively coupled with the processing device 1404. Further, the at least one actuator 1402 may be operationally coupled with at least one of the high-frequency pulse generator stage 1010, the analog low pass filtering stage 1006, and the voltage regulation stage 1008 of the high-efficiency DC-AC inverter 1000. Further, the at least one actuator 1402 may be configured for configuring at least one operational parameter of the at least one of the high-frequency pulse generator stage 1010, the analog low pass filtering stage 1006, and the voltage regulation stage 1008 based on the at least one second command.

Figure 15:
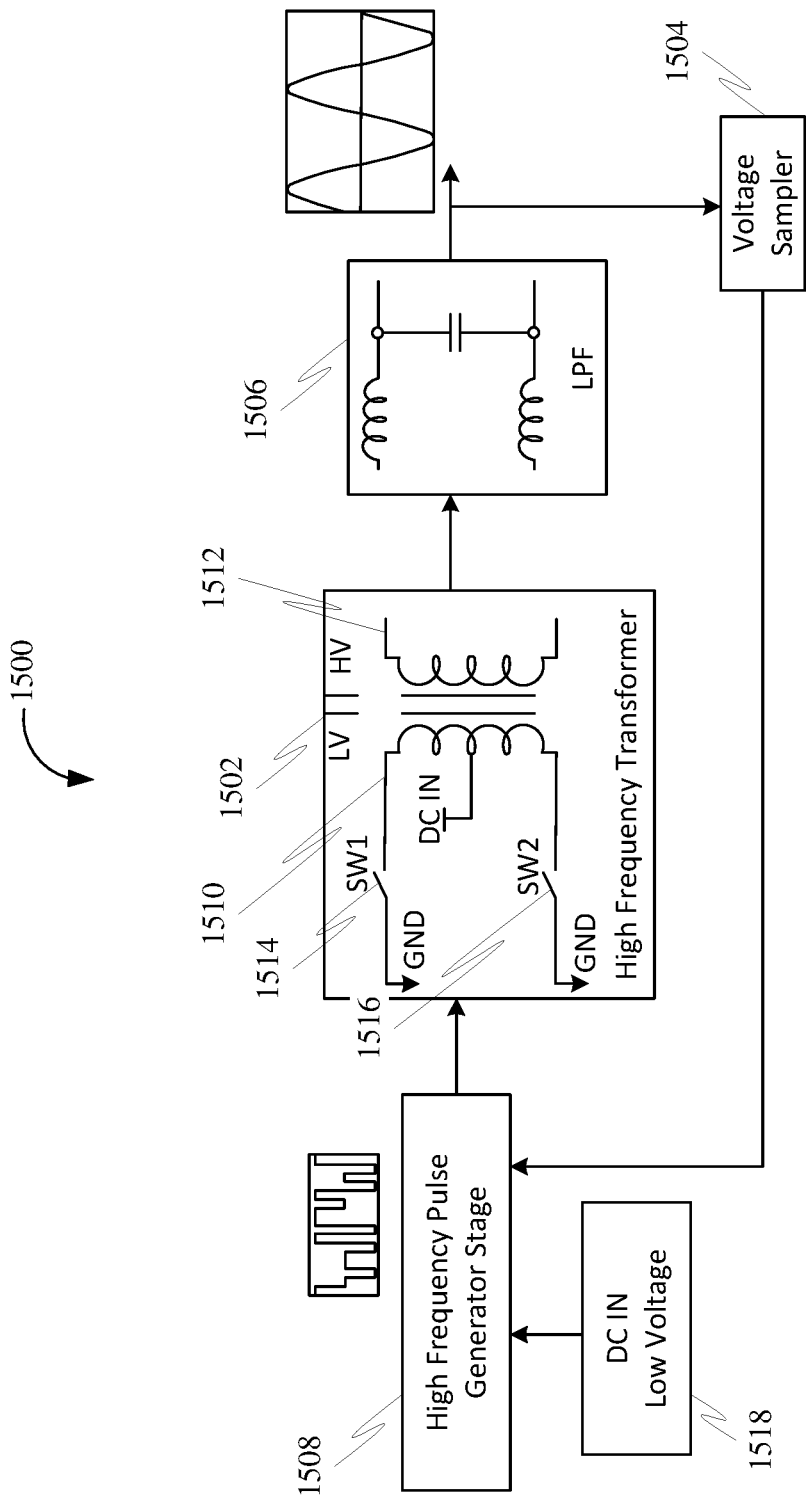
FIG. 15 is a block diagram of a high-efficiency DC-AC inverter, in accordance with some embodiments.

FIG. 15 is a block diagram of a high-efficiency DC-AC inverter 1500, in accordance with some embodiments. Further, the high-efficiency DC-AC inverter 1500 may include a high-frequency pulse generator stage 1508 configured for driving a first switch (SW1) 1514 and a second switch (SW2) 1516 connected to a low voltage side 1510 of a transformer 1502. Further, the high-efficiency DC-AC inverter 1500 may include an analog low pass filtering (LPF) stage 1506 connected to a high voltage side 1512 of the transformer 1502. Further, the high-efficiency DC-AC inverter 1500 may include a voltage regulation stage 1504 configured for regulating voltage via a feedback control loop. Further, the high-efficiency DC-AC inverter 1500 may include a DC input 1518 electrically coupled to the high-frequency pulse generator stage 1508. Further, the DC input 1518 may include a battery.

Figure 16:
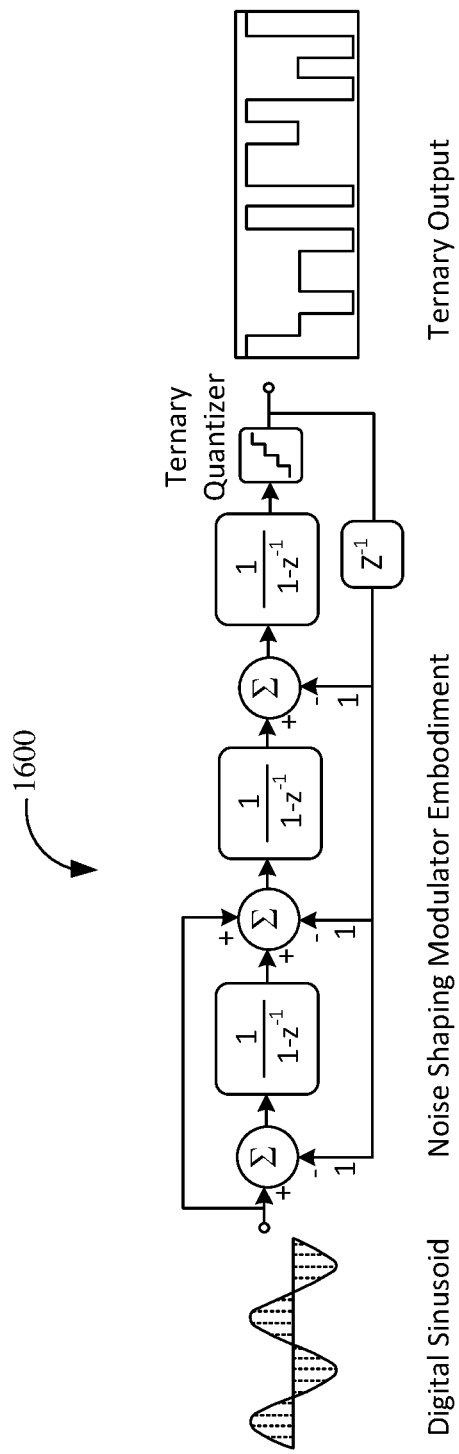
FIG. 16 is a block diagram of a high order oversampling noise-shaping modulator of the high-frequency pulse generator stage of the high-efficiency DC-AC inverter, in accordance with some embodiments.

FIG. 16 is a block diagram of a high order oversampling noise-shaping modulator 1600 of the high-frequency pulse generator stage 1508 of the high-efficiency DC-AC inverter 1500, in accordance with some embodiments. Further, the high-frequency pulse generator stage 1508 may include a high precision sinusoid source and the high order oversampling noise-shaping modulator 1600.

Further, the high precision source may include a digital sine wave generator with amplitude control. Further, amplitude control facilitates voltage regulation. Further, the high precision source may be configured for generating a digital sinusoid.

Further, the high order oversampling noise-shaping modulator 1600 may include an input and an output. Further, the high order oversampling noise-shaping modulator 1600 receives the digital sinusoid at the input. Further, the high order oversampling noise-shaping modulator 1600 achieves high performance in fewer bits. Further, the high order oversampling noise-shaping modulator 1600 may include high pass filters for in-band quantization noise. Further, the high order oversampling noise-shaping modulator 1600 may include a ternary quantizer. Further, the ternary quantizer may be configured for generating 3-level digital PDM (pulse density modulated) output at the output. Further, the 3-level digital PDM output may be configured for driving the first switch (SW1) 1514 and the second switch (SW2) 1516.

Figure 17:
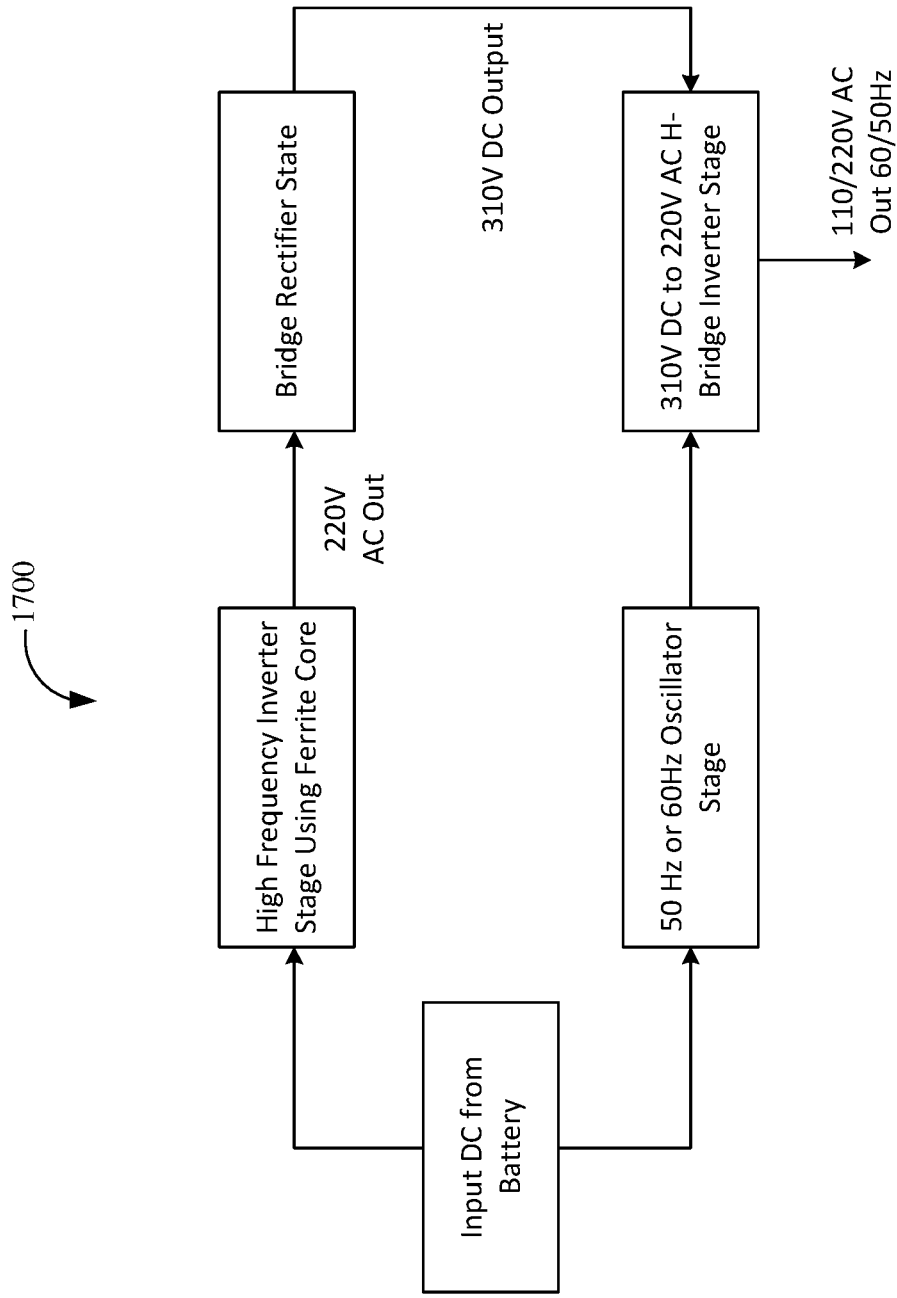
FIG. 17 is a block diagram of a DC-AC inverter.

FIG. 17 is a block diagram of a DC-AC inverter 1700. Further, the DC-AC inverter 1700 may include a multiple-stage power conversion. Further, the multiple-stage power conversion of the DC-AC inverter 1700 may include applying a high-frequency PWM signal to a step-up transformer, rectifying high-frequency pulses, generating a low-frequency pulse from rectified DC, and filtering the low-frequency pulse to achieve a high voltage AC output sinusoid. Further, the DC-AC inverter 1700 may suffer from a hardware overhead of a bridge rectifier and an H-bridge inverter stage. Further, the DC-AC inverter 1700 may suffer from power conversion losses incurred by the bridge rectifier and the H-bridge inverter stage. Further, the DC-AC inverter 1700 may produce high THD at an output even after heavy low pass filtering at the output.

Figure 18:
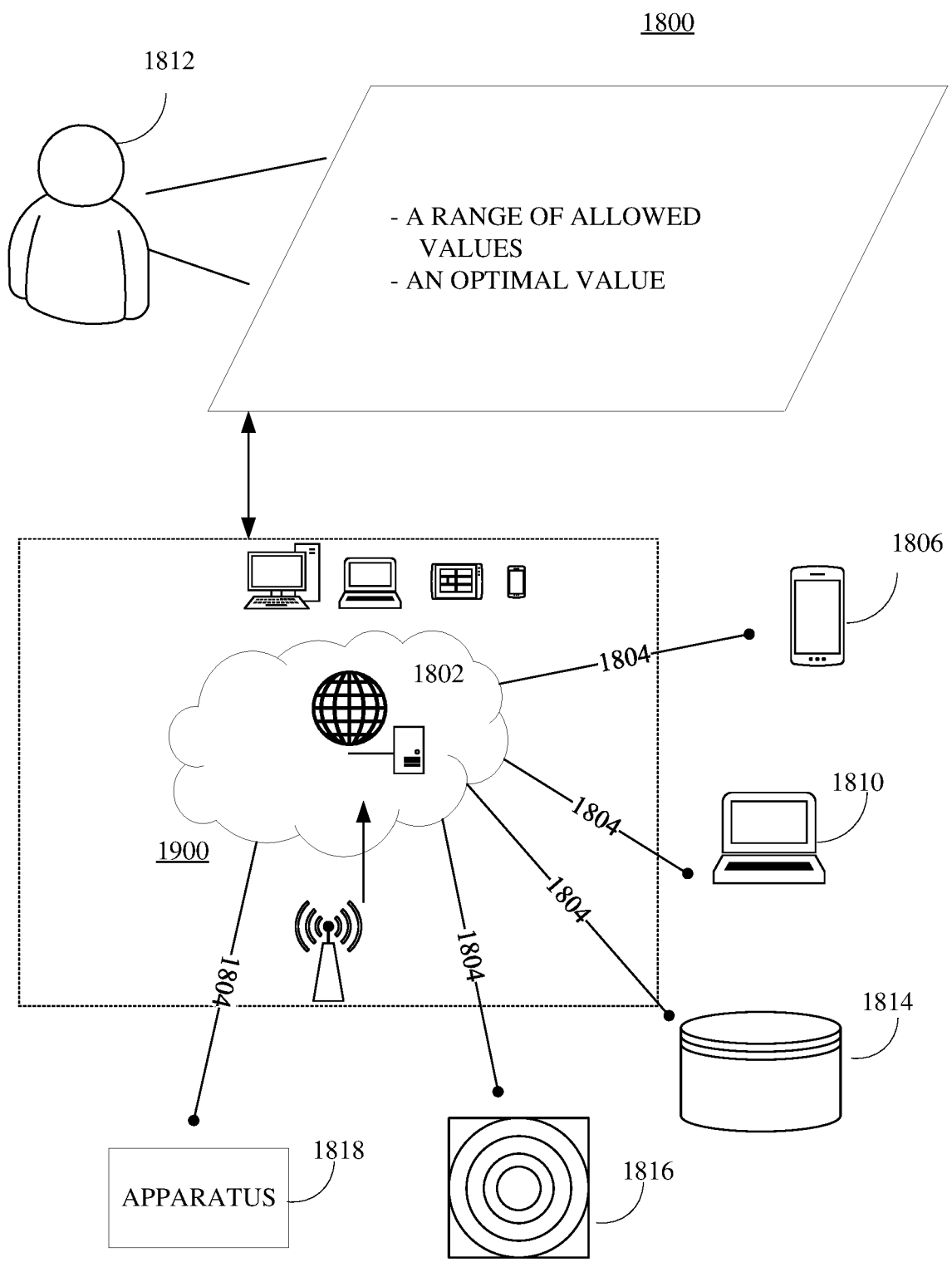
FIG. 18 is an illustration of an online platform consistent with various embodiments of the present disclosure.

FIG. 18 is an illustration of an online platform 1800 consistent with various embodiments of the present disclosure. By way of non-limiting example, the online platform 1800 to facilitate management of a total harmonic distortion (THD) of a DC-AC converter may be hosted on a centralized server 1802, such as, for example, a cloud computing service. The centralized server 1802 may communicate with other network entities, such as, for example, a mobile device 1806 (such as a smartphone, a laptop, a tablet computer etc.), other electronic devices 1810 (such as desktop computers, server computers etc.), databases 1814, sensors 1816, an apparatus 1818 (such as the DC-AC converter 100, the DC-AC converter 700, the high-efficiency DC-AC inverter 1000, etc.) over a communication network 1804, such as, but not limited to, the Internet. Further, users of the online platform 1800 may include relevant parties such as, but not limited to, end-users, administrators, service providers, service consumers and so on. Accordingly, in some instances, electronic devices operated by the one or more relevant parties may be in communication with the platform.

A user 1812, such as the one or more relevant parties, may access online platform 1800 through a web based software application or browser. The web based software application may be embodied as, for example, but not be limited to, a website, a web application, a desktop application, and a mobile application compatible with a computing device 1900.

Figure 19:
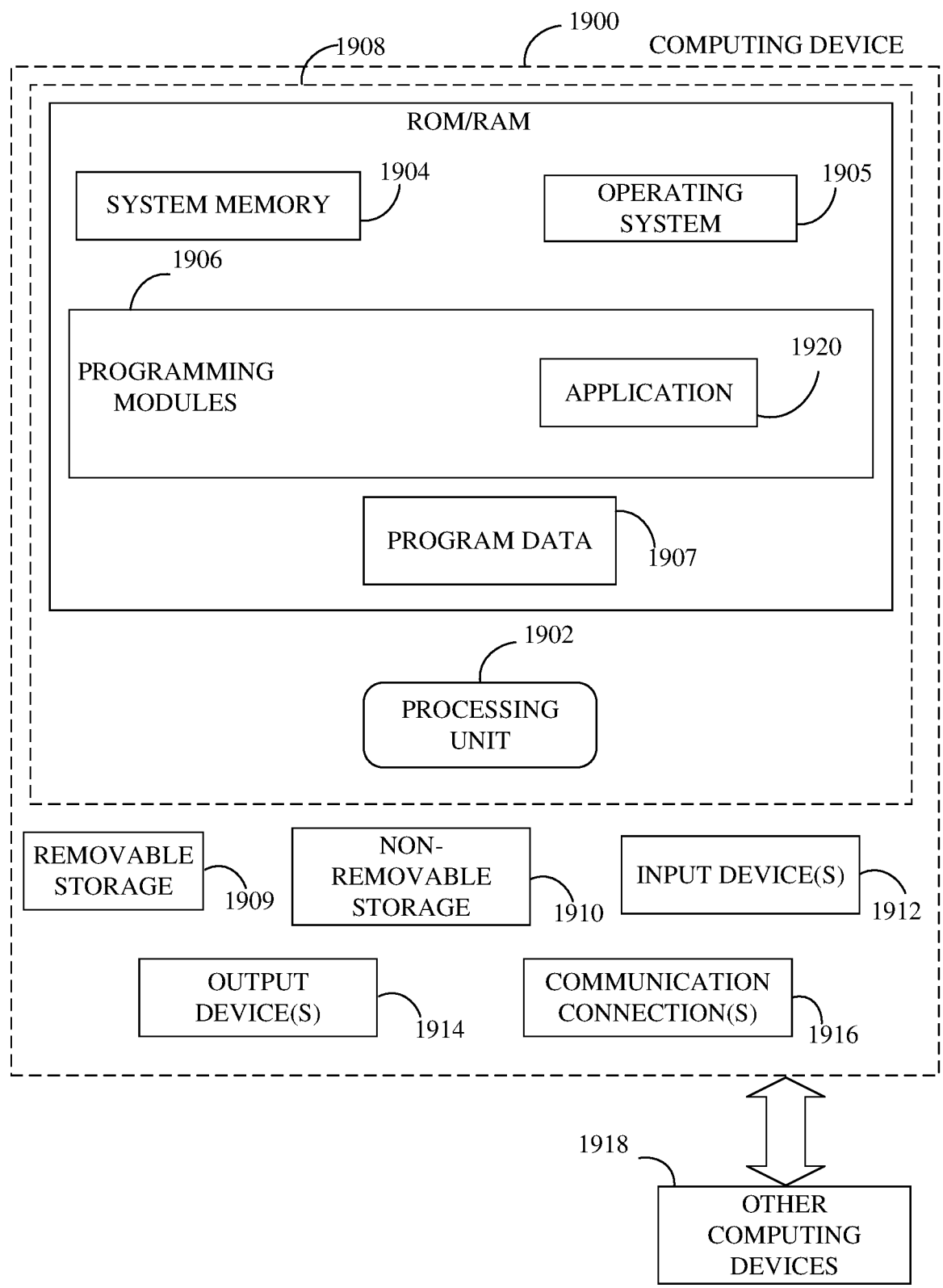
FIG. 19 is a block diagram of a computing device for implementing the methods disclosed herein, in accordance with some embodiments.

With reference to FIG. 19, a system consistent with an embodiment of the disclosure may include a computing device or cloud service, such as computing device 1900. In a basic configuration, computing device 1900 may include at least one processing unit 1902 and a system memory 1904. Depending on the configuration and type of computing device, system memory 1904 may comprise, but is not limited to, volatile (e.g. random-access memory (RAM)), non-volatile (e.g. read-only memory (ROM)), flash memory, or any combination. System memory 1904 may include operating system 1905, one or more programming modules 1906, and may include a program data 1907. Operating system 1905, for example, may be suitable for controlling computing device 1900's operation. In one embodiment, programming modules 1906 may include image-processing module, machine learning module. Furthermore, embodiments of the disclosure may be practiced in conjunction with a graphics library, other operating systems, or any other application program and is not limited to any particular application or system. This basic configuration is illustrated in FIG. 19 by those components within a dashed line 1908.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910. Computer storage media may include volatile and non-volatile, removable and non-removable media implemented in any method or technology for storage of information, such as computer-readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1900. Any such computer storage media may be part of device 1900. Computing device 1900 may also have input device(s) 1912 such as a keyboard, a mouse, a pen, a sound input device, a touch input device, a location sensor, a camera, a biometric sensor, etc. Output device(s) 1914 such as a display, speakers, a printer, etc. may also be included. The aforementioned devices are examples and others may be used.

Computing device 1900 may also contain a communication connection 1916 that may allow device 1900 to communicate with other computing devices 1918, such as over a network in a distributed computing environment, for example, an intranet or the Internet. Communication connection 1916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1904, including operating system 1905. While executing on processing unit 1902, programming modules 1906 may perform processes including, for example, one or more stages of methods, algorithms, systems, applications, servers, databases as described above. The aforementioned process is an example, and processing unit 1902 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A DC-AC converter comprising:
   a transformer comprising a primary winding and a secondary winding, wherein the transformer is a step-up transformer, wherein the primary winding is electrically coupled to a DC voltage source;
   a pulse generator configured for generating a plurality of pulses characterized by a pulse frequency;
   a pulse modulator electrically coupled with the pulse generator, wherein the pulse modulator is configured for generating a pulse density modulated signal based on modulating the plurality of pulses using a sine wave signal of a fundamental frequency;
   a switching element electrically coupled to the primary winding, wherein the switching element is connected in series with the primary winding, wherein the switching element is electrically coupled with the pulse modulator, wherein the switching element is configured to be switched between an on state and an off state based on the pulse density modulated signal, wherein the switching element allows a passage of current in the primary winding in the on state, wherein the switching element does not allow the passage of the current in the primary winding in the off state; and
   an analog low pass filtering stage electrically coupled to the secondary winding, wherein the analog low pass filtering stage is configured for generating an AC voltage of the fundamental frequency based on attenuating a plurality of higher frequency components of an unfiltered AC voltage at the secondary winding.

2. The DC-AC converter of claim 1 further comprising a sinusoid source electrically coupled with the pulse modulator, wherein the sinusoid source is configured for generating the sine wave signal of the fundamental frequency, wherein the generating of the pulse density modulated signal is further based on the generating of the sine wave signal.

3. The DC-AC converter of claim 2 further comprising a voltage regulation stage electrically coupled to the analog low pass filtering stage and the sinusoid source, wherein the voltage regulation stage is configured for:
   generating a sampled AC voltage based on sampling the AC voltage; and
   inputting the sampled AC voltage to the sinusoid source based on the generating of the sampled AC voltage for regulating a voltage level of the AC voltage, wherein the generating of the sine wave signal of the fundamental frequency is based on the sampled AC voltage.

4. The DC-AC converter of claim 1, wherein the sine wave signal comprises a digital sine wave signal, wherein the plurality of pulses is modulated using the digital sine wave signal.

5. The DC-AC converter of claim 1, wherein the analog low pass filtering stage is associated with a predetermined cutoff frequency, wherein the predetermined cutoff frequency is the fundamental frequency, wherein the plurality of higher frequency components associated with a plurality of higher frequencies greater than the predetermined cutoff frequency is attenuated.

6. The DC-AC converter of claim 1, wherein the primary winding comprises a plurality of input terminals, wherein the plurality of input terminal comprises a first input terminal, a second input terminal, and a center tap, wherein the DC voltage source is electrically coupled with the center tap for supplying a DC voltage to the transformer.

7. The DC-AC converter of claim 6, wherein the switching element comprising a first switching element and a second switching element, wherein the first switching element is connected in series with the first input terminal and the second switching element is connected in series with the second input terminal, wherein the first switching element allows the passage of the current in a first portion of the primary winding comprising the first input terminal and the center tap in the on state, wherein the first switching element does not allow the passage of the current in the first portion of the primary winding in the off state, wherein the second switching element allows the passage of the current in a second portion of the winding comprising the second input terminal and the center tap in the on state, wherein the second switching element does not allow the passage of the current in the second portion of the primary winding in the off state.

8. The DC-AC converter of claim 2, wherein the AC voltage is associated with a total harmonic distortion, wherein a value of the total harmonic distortion is based on the pulse frequency of the plurality of pulses in relation to the fundamental frequency of the sine wave signal.

9. The DC-AC converter of claim 8 further comprising:
a measuring device electrically coupled with the analog low pass filtering stage, wherein the measuring device is configured for measuring the value of the THD;
a processing device communicatively coupled with the measuring device, wherein the processing device is configured for:
comparing the value of the THD with a range of allowed values of the THD;
determining the pulse frequency of the plurality of pulses based on the comparing; and
generating a command based on the determining of the pulse frequency;
a memory device communicatively coupled with the processing device, wherein the memory device is configured for storing the range of allowed values of the THD; and
an actuator communicatively coupled with the processing device, wherein the actuator is operationally coupled with the sinusoid source, wherein the actuator is configured for configuring at least one operational parameter of the sinusoid source, wherein the generating of the sine wave signal of the fundamental frequency is further based on the configuring.

10. The DC-AC converter of claim 9, wherein the memory device is communicatively coupled with at least one user device, wherein the at least one user device is configured for:
generating the range of allowed values of the THD; and
transmitting the range of allowed values of the THD to the memory device based on the generating of the range of allowed values of the THD, wherein the storing of the range of allowed values of the THD is further based on the transmitting.

11. The DC-AC converter of claim 8 further comprising:
a receiver device coupled to an electrical load, wherein the receiver device is configured for receiving at least one load requirement from the electrical load;
a processing device communicatively coupled with the receiver device, wherein the processing device is configured for:
analyzing the at least one load requirement;
determining a range of required values of the THD for the electrical load based on the analyzing;
determining the pulse frequency of the plurality of pulses based on the determining of the range of required values of the THD; and
generating a first command based on the determining of the pulse frequency; and
a first actuator communicatively coupled with the processing device, wherein the first actuator is operationally coupled with the sinusoid source, wherein the first actuator is configured for configuring at least one operational parameter of the sinusoid source, wherein the generating of the sine wave signal of the fundamental frequency is further based on the configuring.

12. The DC-AC converter of claim 8 further comprising:
one or more sensors configured for generating one or more sensor data based on one or more variables associated with the DC-AC converter;
a processing device communicatively coupled with the one or more sensors, wherein the processing device is configured for:
analyzing the one or more sensor data;
determining at least one operational condition of the DC-AC converter based on the analyzing;
determining a range of required values of the THD based on the determining of the at least one operational condition;
determining the pulse frequency of the plurality of pulses based on the determining of the range of required values of the THD; and
generating a second command based on the determining of the pulse frequency; and
a second actuator communicatively coupled with the processing device, wherein the second actuator is operationally coupled with the sinusoid source, wherein the second actuator is configured for configuring at least one operational parameter of the sinusoid source, wherein the generating of the sine wave signal of the fundamental frequency is further based on the configuring.

13. A DC-AC converter comprising:
a transformer comprising a primary winding and a secondary winding, wherein the transformer is a step-up transformer, wherein the primary winding is electrically coupled to a DC voltage source;
a pulse generator configured for generating a plurality of pulses characterized by a pulse frequency;
a pulse modulator electrically coupled with the pulse generator, wherein the pulse modulator is configured for generating a pulse density modulated signal based on modulating the plurality of pulses using a sine wave signal of a fundamental frequency;
a sinusoid source electrically coupled with the pulse modulator, wherein the sinusoid source is configured for generating the sine wave signal of the fundamental frequency, wherein the generating of the pulse density modulated signal is further based on the generating of the sine wave signal;
a switching element electrically coupled to the primary winding, wherein the switching element is connected in series with the primary winding, wherein the switching element is electrically coupled with the pulse modulator, wherein the switching element is configured to be switched between an on state and an off state based on the pulse density modulated signal, wherein the switching element allows a passage of current in the primary winding in the on state, wherein the switching element does not allow the passage of the current in the primary winding in the off state; and an analog low pass filtering stage electrically coupled to the secondary winding, wherein the analog low pass filtering stage is configured for generating an AC voltage of the fundamental frequency based on attenuating a plurality of higher frequency components of an unfiltered AC voltage at the secondary winding.

14. The DC-AC converter of claim 13 further comprising a voltage regulation stage electrically coupled to the analog low pass filtering stage and the sinusoid source, wherein the voltage regulation stage is configured for:

generating a sampled AC voltage based on sampling the AC voltage; and inputting the sampled AC voltage to the sinusoid source based on the generating of the sampled AC voltage for regulating a voltage level of the AC voltage, wherein the generating of the sine wave signal of the fundamental frequency is based on the sampled AC voltage.

15. The DC-AC converter of claim 13, wherein the sine wave signal comprises a digital sine wave signal, wherein the plurality of pulses is modulated using the digital sine wave signal.

16. The DC-AC converter of claim 13, wherein the analog low pass filtering stage is associated with a predetermined cutoff frequency, wherein the predetermined cutoff frequency is the fundamental frequency, wherein the plurality of higher frequency components associated with a plurality of higher frequencies greater than the predetermined cutoff frequency is attenuated.

17. The DC-AC converter of claim 13, wherein the primary winding comprises a plurality of input terminals, wherein the plurality of input terminal comprises a first input terminal, a second input terminal, and a center tap, wherein the DC voltage source is electrically coupled with the center tap for supplying a DC voltage to the transformer.

18. The DC-AC converter of claim 17, wherein the switching element comprising a first switching element and a second switching element, wherein the first switching element is connected in series with the first input terminal and the second switching element is connected in series with the second input terminal, wherein the first switching element allows the passage of the current in a first portion of the primary winding comprising the first input terminal and the center tap in the on state, wherein the first switching element does not allow the passage of the current in the first portion of the primary winding in the off state, wherein the second switching element allows the passage of the current in a second portion of the winding comprising the second input terminal and the center tap in the on state, wherein the second switching element does not allow the passage of the current in the second portion of the primary winding in the off state.

19. The DC-AC converter of claim 13, wherein the AC voltage is associated with a total harmonic distortion, wherein a value of the total harmonic distortion is based on the pulse frequency of the plurality of pulses in relation to the fundamental frequency of the sine wave signal.

20. The DC-AC converter of claim 19 further comprising:

a measuring device electrically coupled with the analog low pass filtering stage, wherein the measuring device is configured for measuring the value of the THD;

a processing device communicatively coupled with the measuring device, wherein the processing device is configured for:

comparing the value of the THD with a range of allowed values of the THD;

determining the pulse frequency of the plurality of pulses based on the comparing; and generating a command based on the determining of the pulse frequency;

a memory device communicatively coupled with the processing device, wherein the memory device is configured for storing the range of allowed values of the THD; and an actuator communicatively coupled with the processing device, wherein the actuator is operationally coupled with the sinusoid source, wherein the actuator is configured for configuring at least one operational parameter of the sinusoid source, wherein the generating of the sine wave signal of the fundamental frequency is further based on the configuring.

\* \* \* \* \*